(12) United States Patent
Picard et al.

(10) Patent No.: US 11,654,481 B2
(45) Date of Patent: *May 23, 2023

(54) PLATE CONDITION TOOL

(71) Applicant: VESUVIUS GROUP, S.A., Ghlin (BE)

(72) Inventors: Corentin Picard, Lyons (FR); Antonio Favia, Chassieu (FR); Denis Juan, Meyzieu (FR)

(73) Assignee: Vesuvius Group S.A., Ghlin (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/618,586

(22) PCT Filed: Jun. 8, 2020

(86) PCT No.: PCT/EP2020/065826
§ 371 (c)(1),
(2) Date: Dec. 13, 2021

(87) PCT Pub. No.: WO2020/254133
PCT Pub. Date: Dec. 24, 2020

(65) Prior Publication Data
US 2022/0258229 A1    Aug. 18, 2022

(30) Foreign Application Priority Data

Jun. 18, 2019 (EP) .................................... 19181066
Jun. 18, 2019 (EP) .................................... 19181068

(51) Int. Cl.
*B22D 41/32* (2006.01)
*B22D 41/12* (2006.01)
(Continued)

(52) U.S. Cl.
CPC ............ *B22D 41/32* (2013.01); *B22D 41/12* (2013.01); *B22D 41/28* (2013.01); *B22D 41/38* (2013.01);
(Continued)

(58) Field of Classification Search
CPC ................................ B22D 46/00; B22D 41/28
See application file for complete search history.

(56) References Cited

U.S. PATENT DOCUMENTS

| 506,328 A | 10/1883 | Morris |
| 311,902 A | 2/1885 | Lewis |
| 7,171,326 B2 * | 1/2007 | Gerber .................. B22D 41/28 266/236 |

FOREIGN PATENT DOCUMENTS

| CN | 202815877 U | 3/2013 |
| FR | 2395095 A1 | 1/1979 |

(Continued)

OTHER PUBLICATIONS

Fachbacher R, Binder A, Erlacher A, SAW-RFID and Temperature Monitoring of Slide Gate Plates, IEEE Sensors 2009 : the 8th annual IEEE Conference on Sensors ; Christchurch, New Zealand, Oct. 25-28, 2009, Jan. 1, 2009 IEEE.

*Primary Examiner* — Scott R Kastler
(74) *Attorney, Agent, or Firm* — MaxGoLaw PLLC

(57) ABSTRACT

Plate condition tool for the measurement of condition data of slide gate valve plates coupled to the slide gate valve of a metallurgic vessel, said slide gate valve comprising a collector nozzle, said plate condition tool comprising: a) a main body comprising an obturator for obturating at least partially the collector nozzle; b) a gas injecting device comprising a pressure regulator for injecting a gas in the collector nozzle through the obturator; c) a gas flow measuring device for measuring the flow of the gas injected by the gas injecting device d) a controller being communicatively connected to the gas flow measuring device and being configured to receive input data relating to the relative position of the slide gate valve plates; and wherein the obturator comprises a seal holder for holding a collector nozzle seal.

20 Claims, 21 Drawing Sheets

(51) Int. Cl.
  *B22D 41/38* (2006.01)
  *B22D 41/42* (2006.01)
  *G01M 13/003* (2019.01)
  *B22D 41/28* (2006.01)
  *B22D 46/00* (2006.01)

(52) U.S. Cl.
  CPC ............. *B22D 41/42* (2013.01); *B22D 46/00* (2013.01); *G01M 13/003* (2019.01)

(56) References Cited

FOREIGN PATENT DOCUMENTS

| | | | |
|---|---|---|---|
| JP | 2008221271 | A | 9/2008 |
| WO | 2003080274 | A1 | 10/2003 |
| WO | 2005007325 | A1 | 1/2005 |
| WO | 2010057656 | A1 | 5/2010 |
| WO | 2020254134 | A1 | 12/2020 |

\* cited by examiner

PLATE CONDITION TOOL

CROSS-REFERENCE TO RELATED APPLICATIONS

[0.50] This application is the National Stage application of International Application No. PCT/EP2020/065826, filed Jun. 8, 2020, which claims the benefit of European Provisional Patent Application No. EP 19181066.2, filed Jun. 18, 2019 and of European Provisional Patent Application No. EP 19181068.8, filed Jun. 18, 2019, the contents of each of which are incorporated by reference into this specification.

FIELD OF THE INVENTION

The present invention relates to a tool for the measurement of condition data of slide gate valve plates of a metallurgical vessel, such as a ladle.

DESCRIPTION OF PRIOR ART

Sliding gate valves have been known since 1883. Sliding gate valves are used to control the flow of molten metal poured from an upstream metallurgic vessel to a downstream vessel. For example, from a furnace to a ladle, from a ladle to a tundish or from a tundish into an ingot mould. For example, US-A-0311902 or US-A-050638 disclose sliding gate valves arranged at the bottom of a casting ladle wherein pairs of refractory sliding gate valve plates provided with a through bore are slid one with respect to the other. When the pouring orifices are in register or partially overlap, molten metal can flow through the sliding gate valve (the "casting channel" is open) while when there is no overlap between the pouring orifices, the molten metal flow is totally stopped (the "casting channel" is closed). Partial overlap of the pouring orifices allows the regulation of the molten metal flow by throttling the molten metal stream. Although sliding gate valves have evolved considerably in the last decades, the principle remains the same, with one plate sliding relative to another to control the level of overlap between the through bores of the two plates.

Sliding gate valve plates are operated under severe conditions when mounted in a sliding gate valve and wear off with time, so that they must be replaced frequently. At regular intervals, the metallurgic vessel is thus emptied from its content, moved away from the casting installation and checked for signs of excessive wear. In order to assess the condition of the sliding plates, including the bore wear and the throttling path wear, an operator can simply actuate the slide gate valve (from open to close configuration) and visually observe the condition of the plates and casting channel. Another way consists in inserting a mechanical gauge, a so-called "L-gauge" in the casting channel. This gauge is then actuated by the operator at the interface between the sliding plates in order to assess the wear state of their sliding surfaces. This human operated method has an accuracy strongly dependent on the experience of the operator and is intrinsically prone to error.

JP2008221271 discloses an apparatus and method wherein a gas is injected through the collector nozzle (CNT) of the casting channel of a ladle while the sliding gate valve plates are slid one with respect to the other, a sliding plate being slid with respect to a fixed plate, from the open gate configuration to the closed gate configuration. The gas is injected with the help of an injection hose through a measuring instrument main body. The main body is sealed to the nozzle thanks to an adhesive material such as heat-resistant packing or mortar. The main body is also connected to a suction hose for sucking the air returning from the nozzle. The pressure of the air sent in the injection hose is regulated by a regulator while the pressure of the air sucked in the suction hose is monitored by a pressure sensor. A controller monitors at the same time the pression in the suction hose and the displacement state of the sliding plate measured by a measuring instrument. The goal of the controller is to detect when the pressure measured in the suction hose matches the pressure of the gas injected in the injection hose and the corresponding position of the sliding plate. This position of the sliding plate corresponds to a closing length L wherein the sliding plates have entered in the closed gate configuration because there is no longer an overlap between their pouring orifices. The controller deduces the bore wear state of the sliding plates from such closing length L.

With the method described in this prior art document, the wear state of the sliding plates is summarized by a single value, the closing length L. Even if such value is useful in order to determine the enlargement of pouring orifices due to wear, the method does not provide a way to assess more globally the wear state of the sliding plates. No reliable information can indeed be deduced for example about the throttling path erosion of the sliding plates, while this can be a source of leakage of molten metal in the slide gate valve. Furthermore, the method from this prior art document does not provide a way to assess the quality of the sealing between the main body of the measuring instrument and the collector nozzle. In this regard, the reliability of the method and apparatus described above is limited.

SUMMARY OF THE INVENTION

It is an object of the present invention to provide an apparatus for the assessment of the sliding gate valve plates of a metallurgical vessel, such as a ladle. The apparatus must provide reliable measurements and be able to assess globally the wear state of the sliding plates.

The present invention is defined in the appended independent claims. Preferred embodiments are defined in the dependent claims. In particular, the invention concerns a plate condition tool for the measurement of condition data of slide gate valve plates coupled to the slide gate valve of a metallurgic vessel, such as a ladle, said slide gate valve comprising a collector nozzle protruding from an outer wall of said slide gate valve along a collector nozzle main axis parallel to a slide gate valve first axis X1', said slide gate valve first axis X1' defining an orthonormal frame of reference together with slide gate valve second axis X2' and third axis X3', said slide gate valve being able to switch between an open and a closed configuration by sliding at least two slide gate valve plates with respect to one another, said collector nozzle being in fluid communication with a casting channel of said metallurgic vessel when said slide gate valve is in the open configuration, said plate condition tool comprising:

a) a main body comprising an obturator for obturating at least partially the collector nozzle;
b) a gas injecting device comprising a pressure regulator for injecting a gas in the collector nozzle through the obturator at a target pressure;
c) a gas flow measuring device for measuring the flow of the gas injected by the gas injecting device or a pressure measuring device for measuring the gas pressure in the collector nozzle;
d) a controller being communicatively connected to the gas flow measuring device or to the pressure measuring device and being configured to receive input data relating to the relative position of the slide gate valve plates;

wherein the obturator comprises a seal holder for holding a collector nozzle seal, said seal holder being movable relative to said main body at least along a forward axis X1 of said main body, said forward axis defining an orthonormal frame of reference of said main body together with main body second axis X2 and third axis X3, and wherein:
  i. the plate condition tool comprises an anchoring system for anchoring the main body to an anchoring portion of the metallurgic vessel or to the ground in the vicinity of the metallurgic vessel, in that the distance between a reference point of the main body and a reference point of the outer wall of the slide gate valve cannot exceed a maximal distance D_max with respect to said slide gate valve first axis X1' when said main body is displaced relative to the slide gate valve along said slide gate valve first axis X1';
  ii. the anchoring system is configured such that when the main body is anchored to the metallurgical vessel or to the ground in the vicinity of the metallurgical vessel, the seal holder faces the collector nozzle in the plane X2'X3' of the slide gate valve in that the collector nozzle seal can be pressed along the forward axis X1 of the main body against the collector nozzle for obturating said collector nozzle; and
  iii. the plate condition tool comprises a mechanical actuator, said mechanical actuator being coupled to main body and to the seal holder, said mechanical actuator being configured to move the seal holder relative to the main body, at least along said forward axis X1 of the main body, such to press the collector nozzle seal against the collector nozzle when (i) the main body is anchored to the metallurgic vessel or to the ground in the vicinity of the metallurgic vessel and (ii) is located at the maximal distance D_max.

In an advantageous embodiment, the anchoring system comprises at least one anchoring rod extending along forward axis X1 of the main body, said anchoring rod comprising a distal end and a proximal end, said proximal end being fixed to the main body, said anchoring rod comprising a rotating anchoring head at its distal end, said anchoring head being rotatable about the forward axis X1 of the main body for being anchored in an anchoring passage of the slide gate valve.

In an advantageous embodiment, the anchoring system comprises at least one through hole in the front wall of a housing of the main body for receiving a pin jutting out of the outer wall of the slide gate valve, said pin comprising at least one groove in is outer surface, said anchoring system comprising a coupling element inside the housing, said coupling element comprising a concave profile in the plane X2X3 and being movable in translation along said axis X2 or along said axis X3 of the main body in that the coupling element can be moved up to a position wherein its concave profile can be secured in the at least one groove of the pin after said pin has been inserted in the through hole.

In an advantageous embodiment, the anchoring system comprises a leg for supporting the main body, said leg being adjustable in length and being rigidly coupled to a support base, and the anchoring system comprises fastening means for fastening the support base to the ground in the vicinity of the metallurgical vessel.

In an advantageous embodiment, the mechanical actuator comprises a closed inflatable chamber with a deformable wall, wherein the closed inflatable chamber can be inflated to a variable pressure, said closed inflatable chamber being placed between the seal holder and a backing wall of the main body.

In an advantageous embodiment, the resilient elements are positioned in the main body such to exert a restoring force against the expansion of the closed inflatable chamber.

In an advantageous embodiment, the plate condition tool comprises a gas flow measuring device for measuring the flow of the gas injected by the gas injecting device and the controller is configured to store in a memory of said controller the gas flow (GF) necessary to reach the target pressure and the relative position (RP) of the slide gate valve plates as functions of the time variable.

In an advantageous embodiment, the controller is configured to process the gas flow (GF) function such to extract a first indicator by computing the derivative of said function and a second indicator by computing the integral of said function.

In an advantageous embodiment, the controller is communicatively connected to the pressure regulator.

In an advantageous embodiment, the controller is configured to control the relative sliding motion of the slide gate valve plates.

In an advantageous embodiment, the plate condition tool comprises a rangefinder, the rangefinder being mounted on the main body and being configured to measure the distance between said rangefinder and a target mounted on a fixed part of the metallurgic vessel, said rangefinder being communicatively connected to said controller.

The invention also concerns a kit of parts comprising a plate condition tool and a slide gate valve, wherein the anchoring system is configured to be anchored to an anchoring portion of said slide gate valve.

In an advantageous embodiment, the anchoring system of the plate condition tool in the kit of parts is configured to be anchored to at least one anchoring passage in the outer wall of said slide gate valve, said at least one anchoring passage comprising an entry portion and a bottom portion, wherein the cross section in the X2'X3' plane of the bottom portion is larger than and encompasses the cross section in the X2'X3' plane of the entry portion.

In an advantageous embodiment, the anchoring system of the plate condition tool in the kit of parts is configured to be anchored to at least one pin jutting out of the outer wall of the slide gate valve, said at least one pin comprising at least one groove located in the outer surface of said at least one pin or comprising a portion with a reduced cross section in the X2'X3' plane compared to the cross section of a distal end of the pin, in that the distal end is shaped as an anchoring head of said pin.

The invention also concerns a kit of parts comprising (i) a plate condition tool and (ii) an anchoring system comprising a leg fixable to said plate condition tool, a support base fixable to said leg and fastening means for fixing the support base to the ground.

The invention also concerns a kit of parts comprising a plate condition tool and a heat shield to be fixed to the outer wall of a slide gate valve, said heat shield comprising a through hole for receiving the collector nozzle of the slide gate valve and wherein the anchoring system of the plate condition tool is configured to be anchored to an anchoring portion of said heat shield.

In an advantageous embodiment, the anchoring system of the plate condition tool is configured to be anchored to at least one anchoring passage in the heat shield, said at least one anchoring passage comprising an entry portion and a bottom portion, wherein the cross section in the X2'X3' plane of the bottom portion is larger than and encompasses the cross section in the X2'X3' plane of the entry portion.

In an advantageous embodiment, the anchoring system of the plate condition tool is configured to be anchored to at least one pin of the heat shield, said at least one pin comprising at least one groove located in the outer surface of said at least one pin or comprising a portion with a reduced cross section in the X2'X3' plane compared to the cross section of a distal end of the pin, in that the distal end is shaped as an anchoring head of said pin.

The invention also concerns a method of operating the plate condition tool according to the invention wherein the slide gate valve is initially set in a closed configuration, and the slide gate valve plate is moved from the closed configuration to the open configuration.

In an advantageous implementation of the method of operating the plate condition tool, a preliminary step for the adjustment of the sealing is implemented, said preliminary step comprising:
  Operating the mechanical actuator such to press the collector nozzle seal against the collector nozzle;
  Operating the gas injecting device such to reach a target pressure in the collector nozzle;
  Measuring the residual gas flow necessary to maintain such target pressure in the collector nozzle;
  Increasing the force applied by the mechanical actuator if the residual gas flow measured exceeds a given threshold.

BRIEF DESCRIPTION OF THE DRAWINGS

These and further aspects of the invention will be explained in greater detail by way of example and with reference to the accompanying drawings in which.

The figures are not drawn to scale.

DETAILED DESCRIPTION OF PREFERRED EMBODIMENTS

Figure 1:
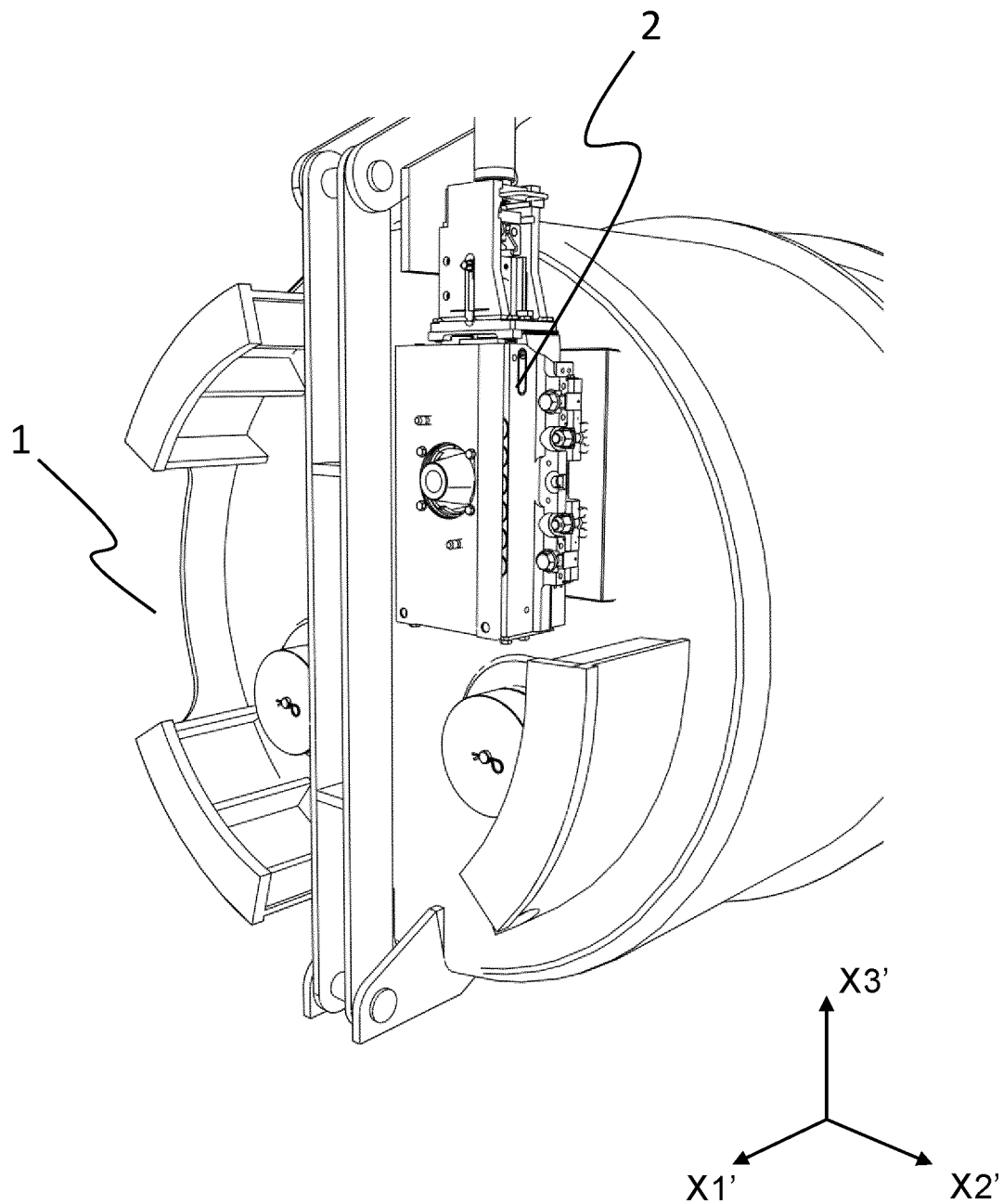
FIG. 1 shows a perspective view of the bottom of ladle comprising a slide gate valve.
Figure 2A:
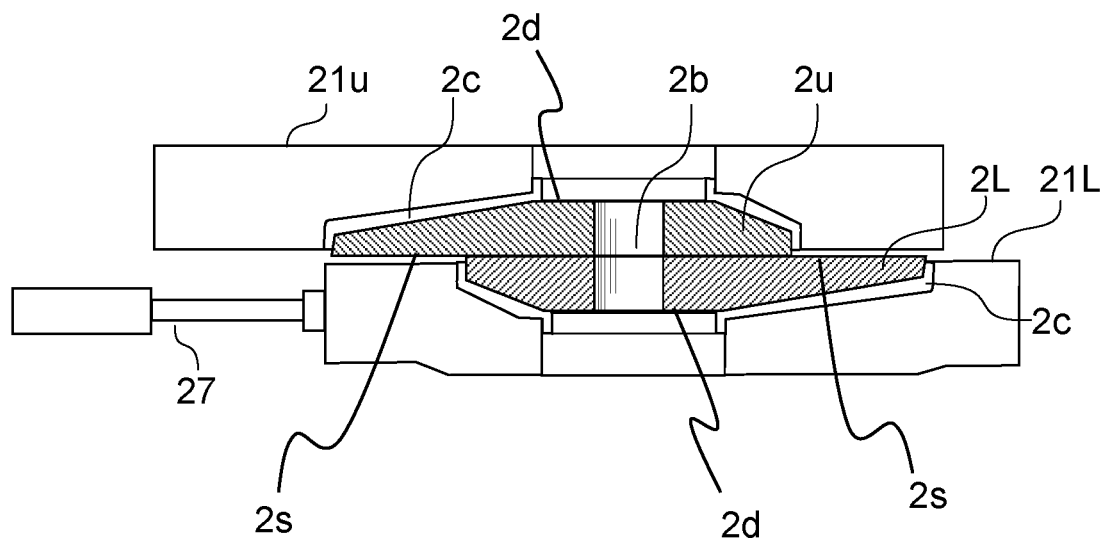
FIG. 2 shows (a) a two-plate and (b) a three-plate sliding gate valve of a metallurgical vessel.
Figure 2B:
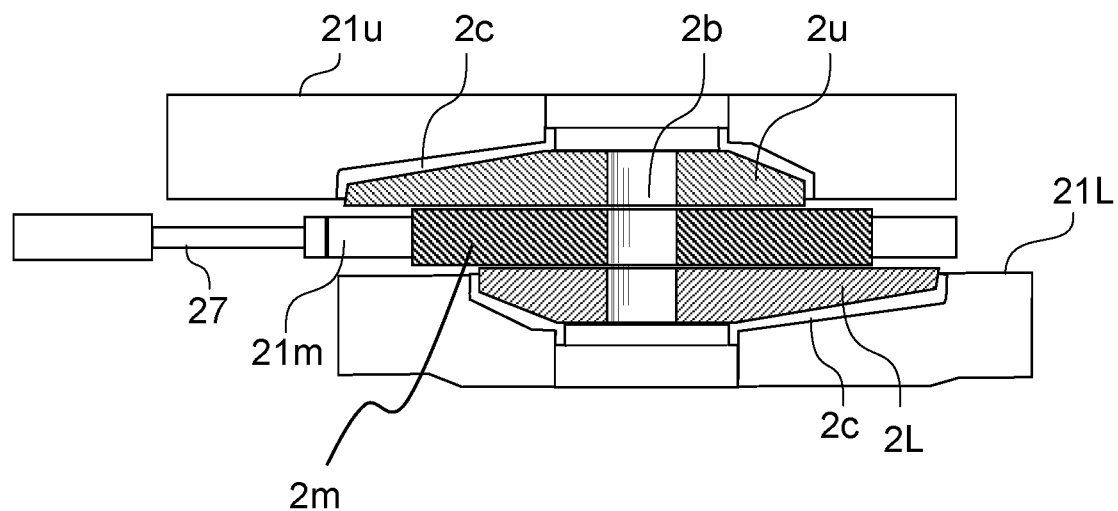
Figure 3:
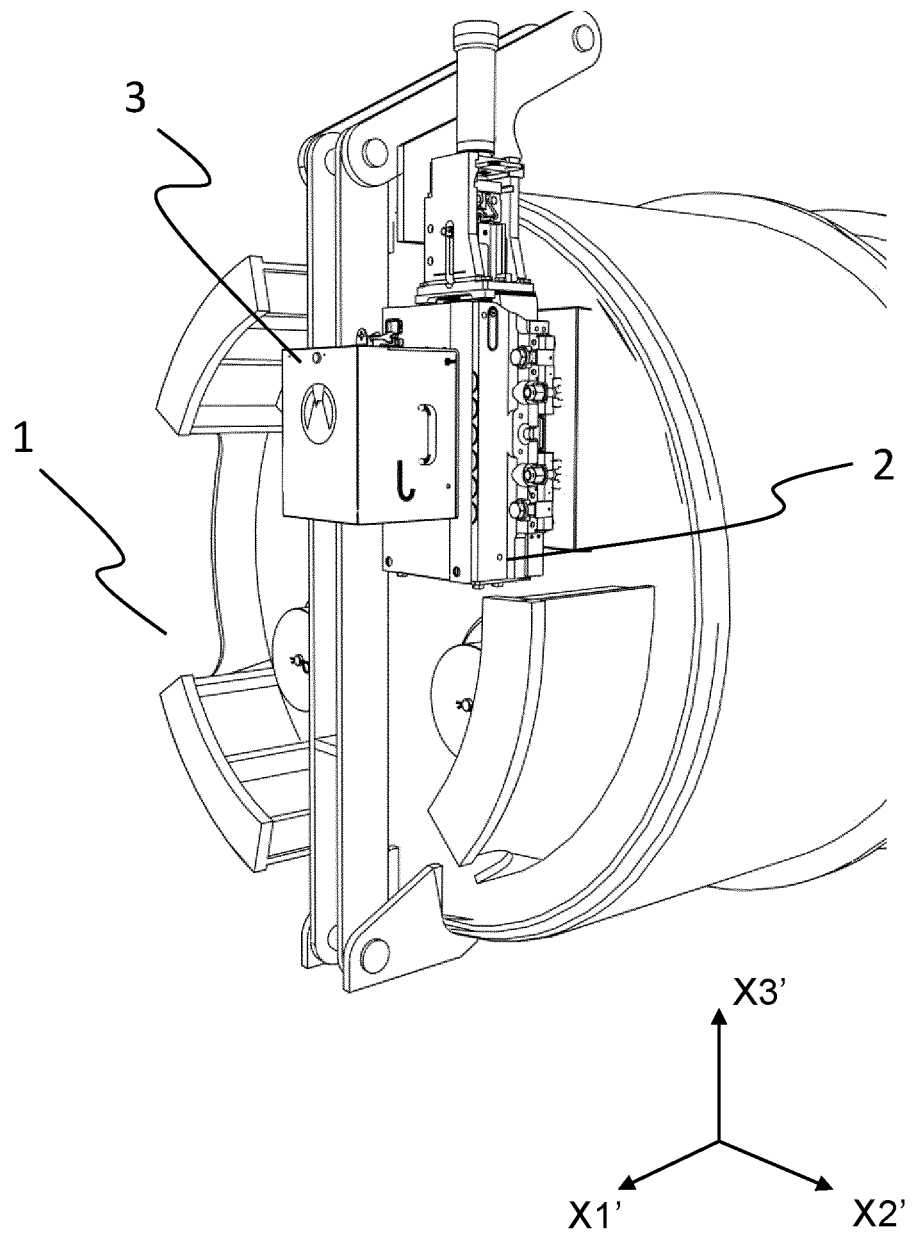
FIG. 3 shows a perspective view of the bottom of ladle comprising a slide gate valve to which is coupled a plate condition tool according to the invention.

FIG. 1 shows the bottom of a ladle 1 lying on its side in a workshop where it is checked for worn elements and for refurbishing. The ladle 1 comprises a slide gate valve 2 for controlling the flow through a collector nozzle 2n of said ladle 1. As explained supra, such slide gate valve 2 comprises slide gate valve plates. The sliding gate valve can be a two-plate or a three-plate sliding gate valve. As illustrated in FIG. 2(a) a two-plate sliding gate valve comprises a top sliding gate valve plate 2u and a bottom sliding gate valve plate 2L, whilst a three-plate sliding gate as illustrated in FIG. 2(b) further comprises a mid-sliding gate valve plate 2m sandwiched between a top and a bottom sliding gate valve plate 2u, 2L.

A sliding gate valve plate comprises a sliding surface 2s separated from a second surface 2d by a thickness of the sliding gate valve plate and joined to one another by a peripheral edge. It also comprises a through bore 2b extending normal to the sliding surface. The second surface 2d of a mid-sliding gate valve plate 2m is also a sliding surface. The top, bottom, and optionally the mid-sliding gate valve plates are each coupled to a receiving cradle 2c of a corresponding top, bottom, and optionally mid-plate support frame 21t, 21L, 21m, with at least one sliding surface 2s of one plate in sliding contact with a sliding surface 2s of a second plate.

The top plate support frame 21u is fixed relative to the metallurgic vessel, and the top sliding gate valve plate 2u is generally coupled to an inner nozzle of the metallurgic vessel. In a two-plate sliding gate valve (cf. FIG. 2(a)) the bottom plate support frame 21L is a movable carriage which can translate driven by a pneumatic or hydraulic piston 27 such that the sliding surface of the bottom sliding gate valve plate slides in contact against and relative to the sliding surface of the top sliding gate valve plate. In a three-plate sliding gate valve, the bottom plate support frame 21L is fixed relative to the top plate support frame and to the metallurgic vessel. The mid-plate support frame 21m is a movable carriage suitable for sliding the two sliding surfaces of the mid-sliding gate valve plate against and relative to the sliding surfaces of the top and bottom sliding gate valve plates, respectively. As well known in the art, the sliding translation of the sliding surface of a sliding gate valve plate relative to the sliding surface of the top sliding gate valve plate and, optionally, of the bottom sliding gate valve plate in a three-plate sliding gate valve, allows the control of the level of overlap between the through bores 2b of the two (or three) plates.

As explained supra, sliding gate valve plates need to be replaced within short intervals of time, due to the mechanical and thermal constraints under which they are operated. In particular, after several casting operations, their sliding surfaces 2s can become eroded. Their through bores 2b can also become enlarged and/or their edge rounded. In order to decide whether or not the slide gate valve plates have to be replaced, it is necessary to assess beforehand their wear condition. The present invention proposes a plate condition tool 3 for assessing the wear condition of sliding gate valves plates while they are still coupled to the metallurgical vessel, such as the ladle 1.

Figure 4:
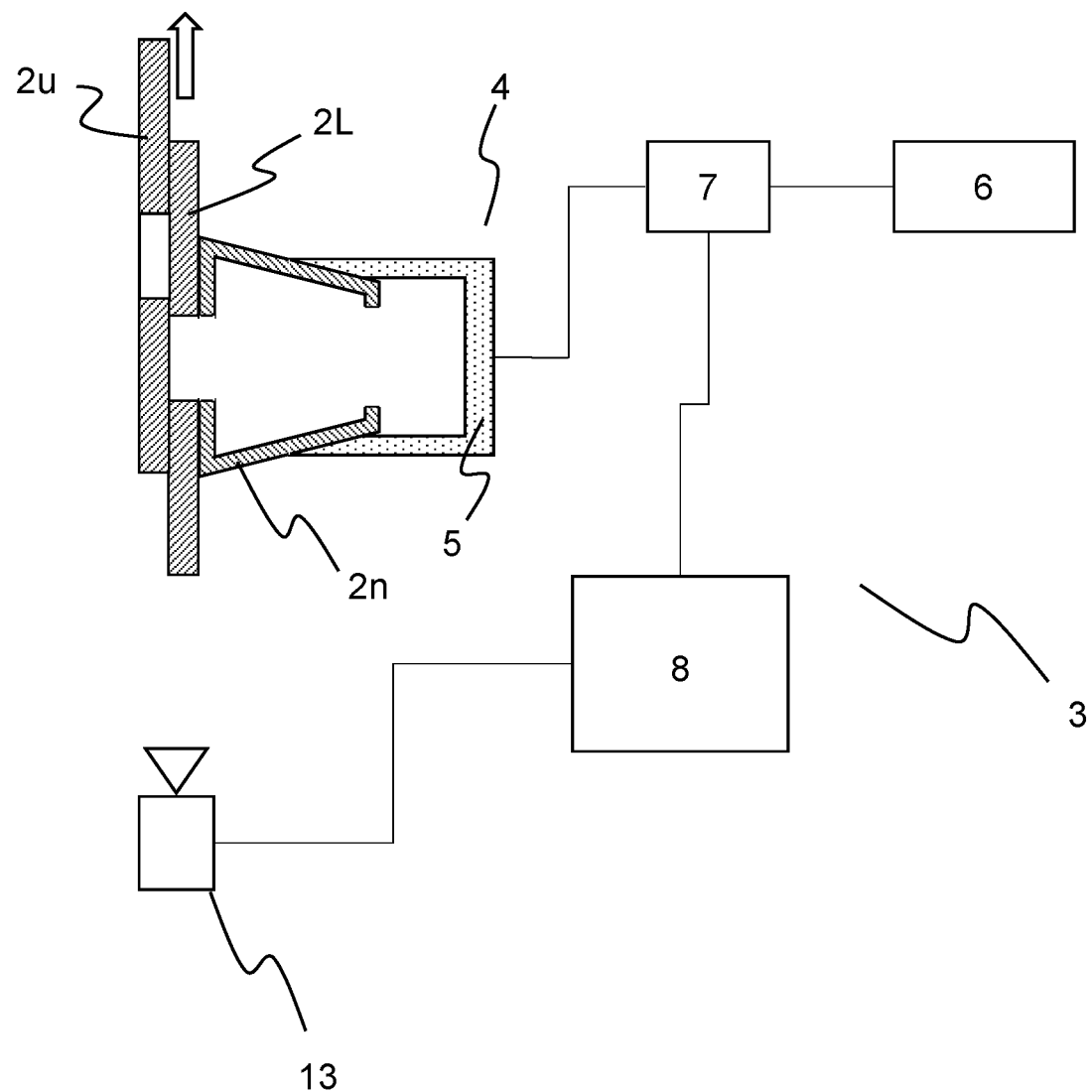
FIG. 4 is a schematic view of the main components of plate condition tool according to the invention coupled to a slide gate valve.
Figure 5:
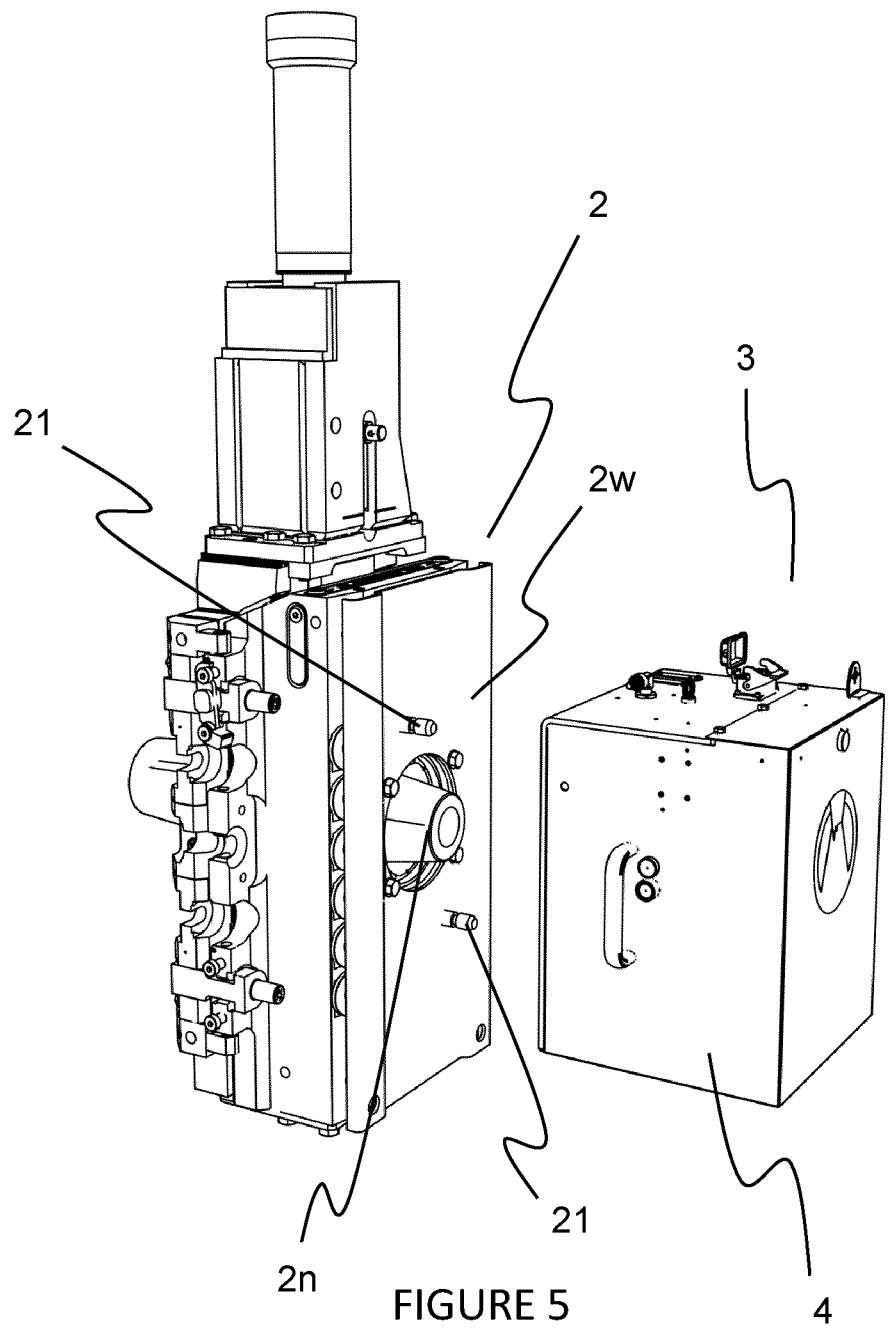
FIG. 5 shows in more details a perspective view of a slide gate valve in front of a plate condition tool according to the invention.
Figure 6:
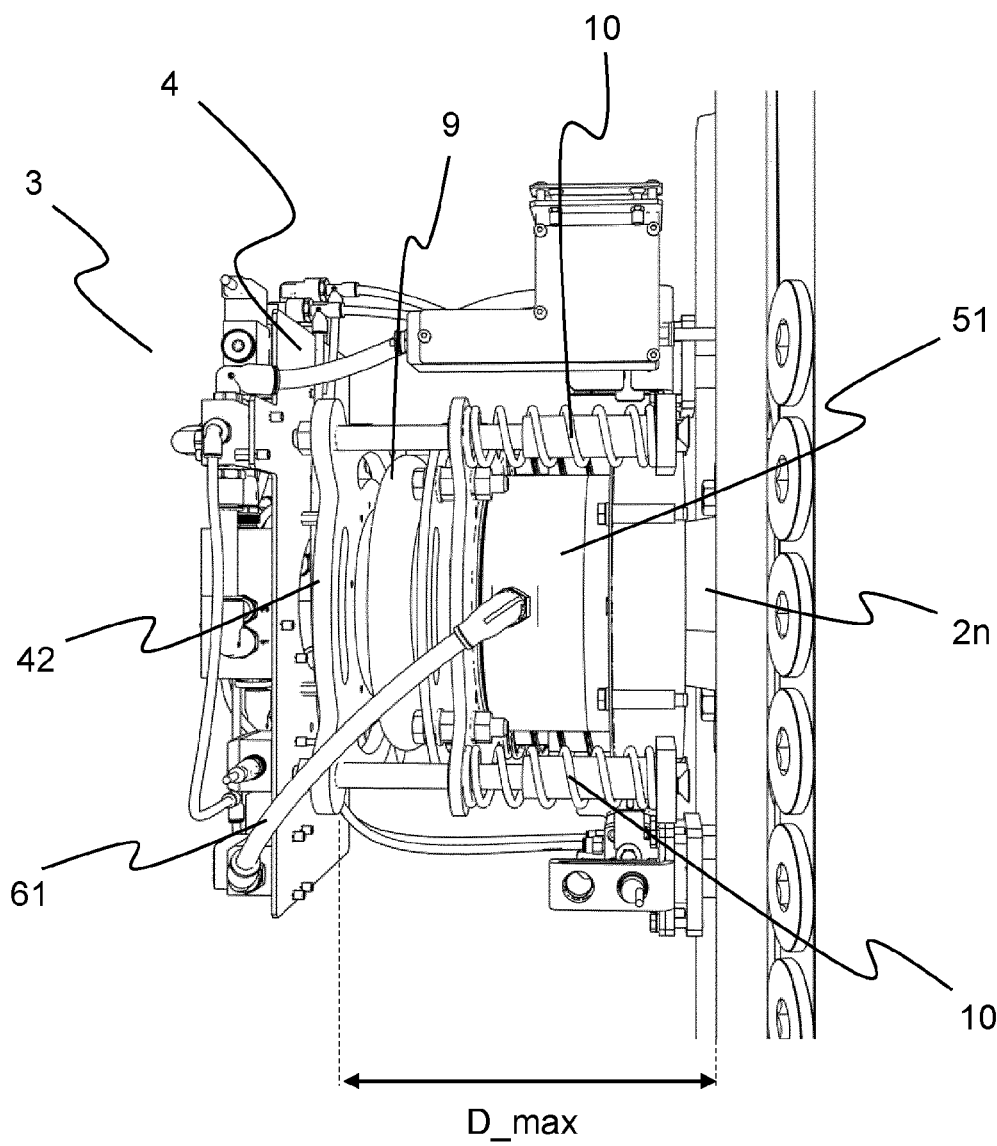
FIG. 6 shows a side view of the interior of a plate condition tool according to the invention coupled to slide gate valve.
Figure 7:
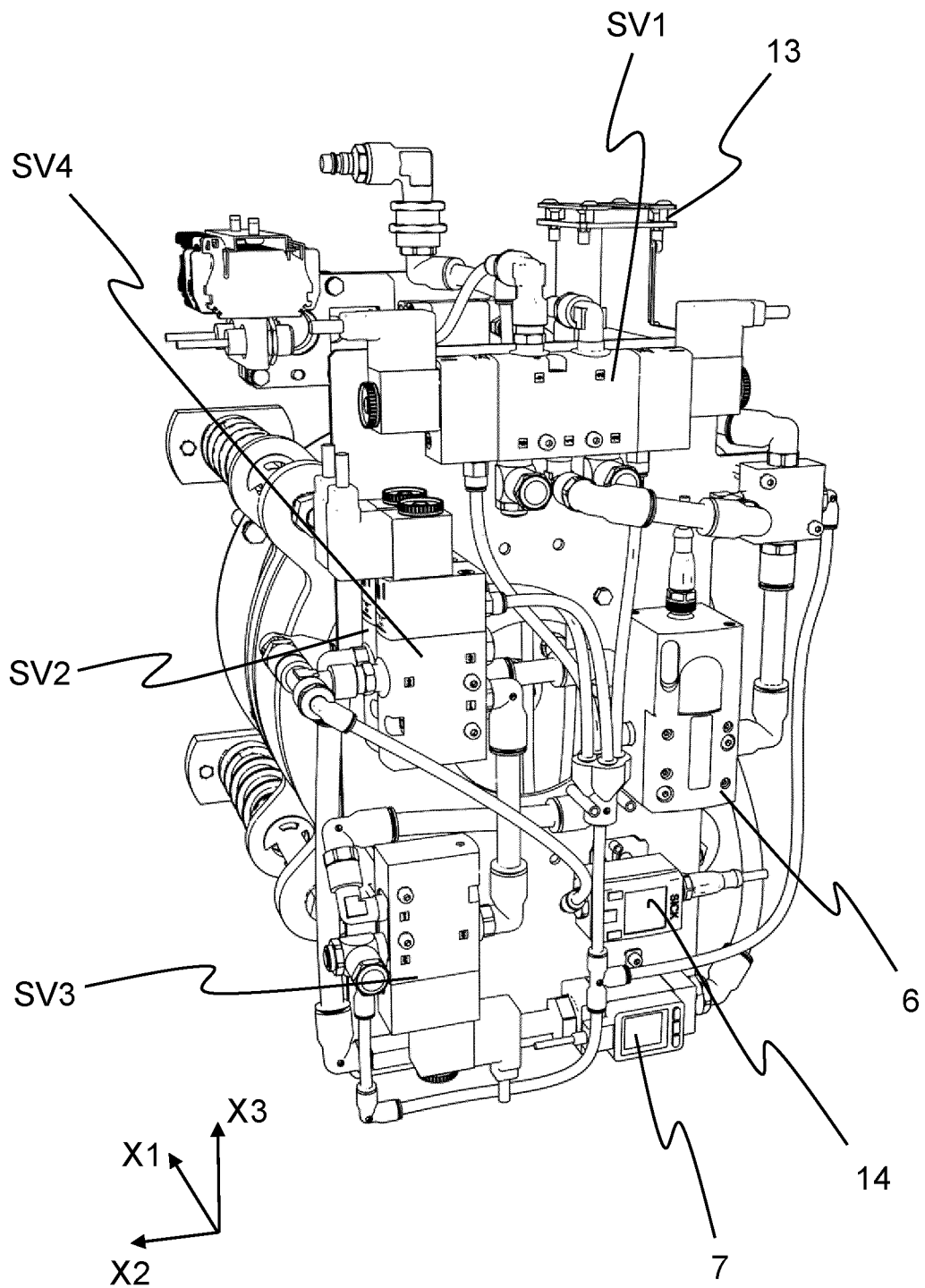
FIG. 7 shows a first perspective view of the interior of a plate condition tool according to the invention.
Figure 8:
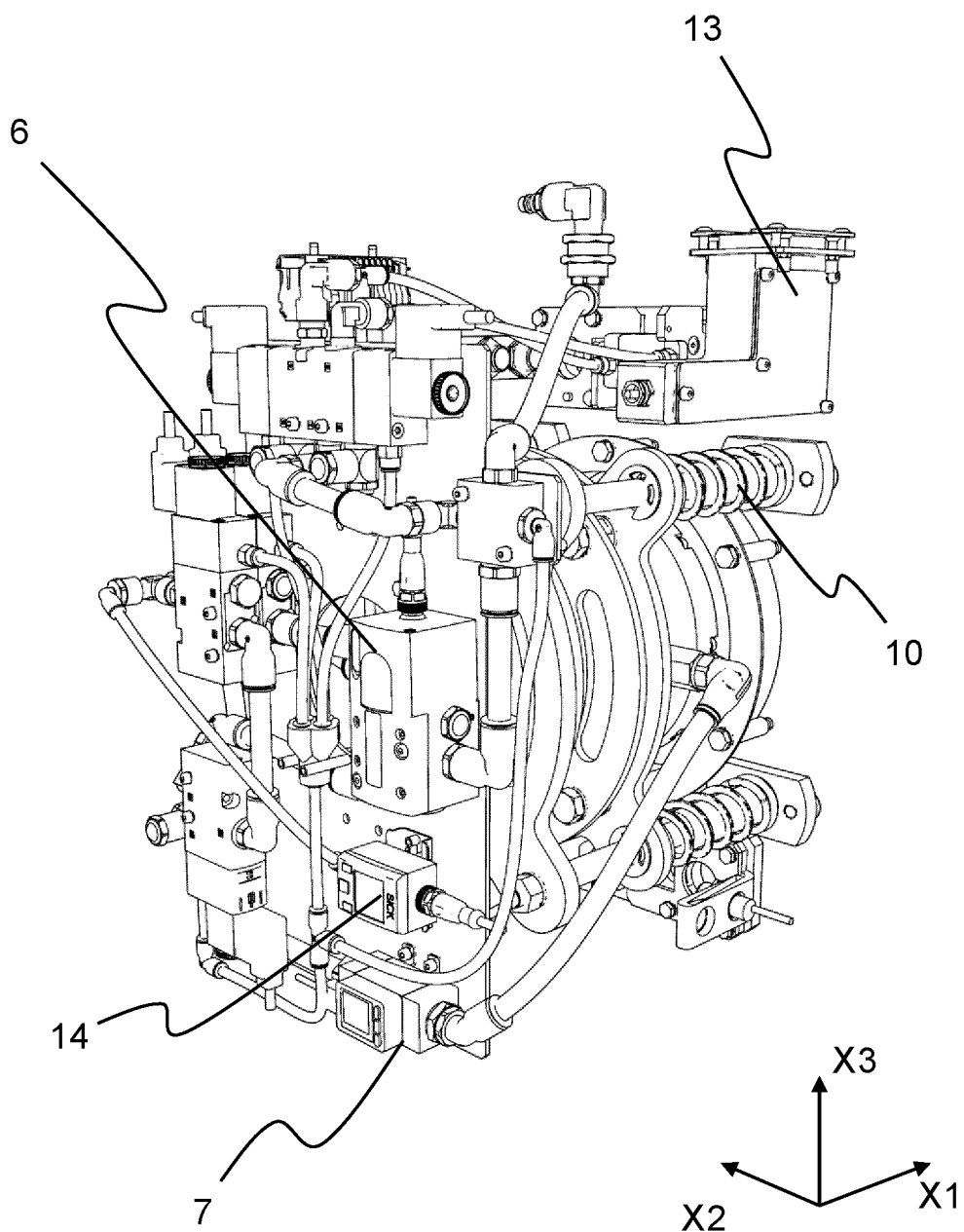
FIG. 8 shows a second perspective view of the interior of a plate condition tool according to the invention.
Figure 9:
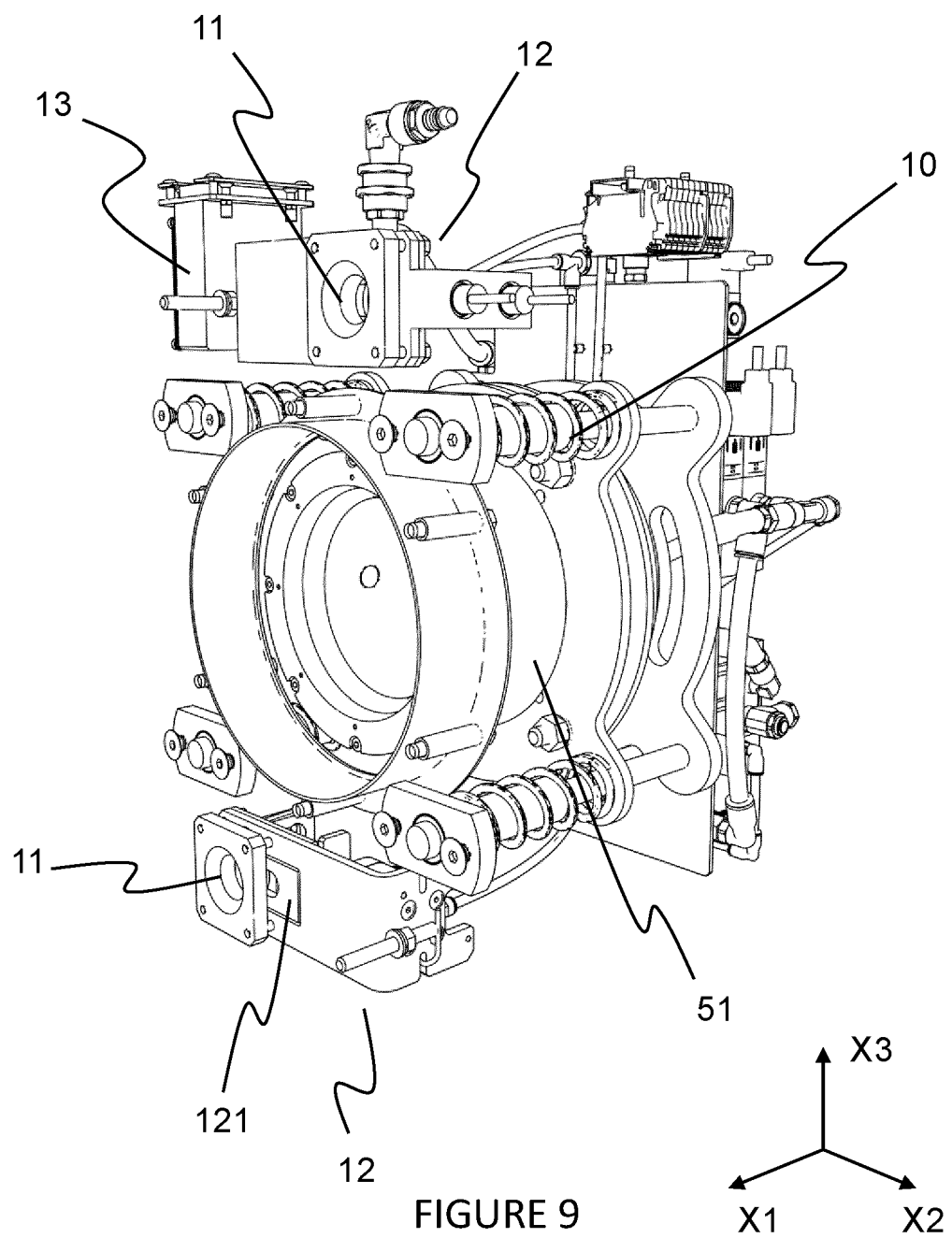
FIG. 9 shows a third perspective view of the interior of a plate condition tool according to the invention.

As illustrated in FIGS. 4-5, the plate condition tool 3 according to the present invention has a main body 4 comprising an obturator 5 for obturating, at least partially, the collector nozzle 2n. The function of the obturator is to oppose a resistance, sometimes inaccurately called "back-pressure", against the displacement of a gas trying to flow out of the collector nozzle 2n. As illustrated in FIGS. 6-10, the obturator 5 can comprise a seal holder 51 for holding seal to be pressed against the collector nozzle 2n. In another embodiment, the obturator 5 can comprise a cap screwed on a thread of the collector nozzle 2n. In yet another embodiment, the obturator can comprise a cap chemically sealed, for example thanks to a cement, to the collector nozzle 2n. In a preferred embodiment, the obturator is configured to be a perfect airtight closure of the collector nozzle 2n. A perfect airtight closure is however not essential to the implementation of a plate condition test with the plate condition tool according to the invention. The plate condition tool 3 can indeed be used for example even with a damaged collector nozzle 2n to which the obturator can no longer be sealed airtight.

One essential feature of present invention is a gas injecting device comprising a pressure regulator 6 for injecting a gas in the collector nozzle 2n through the obturator 5 at a target pressure. The pressure regulator 6 can be located on a plate at the back of the plate condition tool 3, as illustrated in FIGS. 6-9. A pressure regulator is a control valve configured to receive a gas at an input pressure and to reduce such input pressure to a desired value, the target pressure, at its output. In the present invention, the pressure regulator 6 can for example be an electronic proportional pressure regulator configured to receive compressed air at a pressure of 6 bar from a high-pressure air supply, and to regulate the gas flow between its input and its output such to maintain a target pressure of 1.5 bar at its output. The gas injecting device is advantageously configured to inject the gas in a through hole of the obturator 5 thanks to a supply duct 61 able to be in fluid communication with the output 6s of the pressure regulator 6 (see FIG. 12b).

Another essential feature of the present invention is the presence of a gas flow measuring device 7, or flowmeter 7, configured to measure the flow of the gas injected by the gas injecting device in the collector nozzle 2n. As illustrated in FIG. 4, such gas flow measuring device 7 is advantageously fitted between the pressure regulator 6 and the obturator 5, such that the gas coming from the output of the pressure regulator 6 flows through the gas flow measuring device 7 before entering the collector nozzle 2n. As an alternative to the gas flow measuring device 7, a pressure measuring device can be used to measure the pressure inside the collector nozzle, such to be able to compare this actual pressure value in the collector nozzle to the target pressure setpoint value of the pressure regulator in order to determine whether or not the through holes of the slide gate valve plates overlap, in a similar way to what is disclosed in prior art document JP2008221271. The pressure measuring device is then advantageously fitted to the collector nozzle through the obturator 5.

A third essential feature of the present invention is a controller 8 being communicatively connected to the gas flow measuring device 7, or to the pressure measuring device, and being configured to receive input data relating to the relative position of the slide gate valve plates. Such controller is advantageously an electronic controller, such as a PLC, configured to store in a memory of said controller values of (i) the gas flow and of (ii) the relative position of the slide gate valve plates at successive timesteps. In an advantageous embodiment, the controller 8 is communicatively connected to the pressure regulator 6. The controller 8 is then a central unit which monitors the pressure regulated by the pressure regulator 6, the gas flow measured by the flowmeter 7 and the relative position of the slide gate vale plates 2u, 2L, 2m. In an advantageous embodiment, the controller 8 is further configured to control the relative sliding motion of the slide gate valve plates 2u, 2L, 2m by actuating the pneumatic or hydraulic piston 27. In this configuration, the controller 8 will be able to initiate itself the relative sliding motion of the slide gate vale plates 2u, 2L, 2m necessary to implement a full plate condition test. In an advantageous embodiment, the controller 8 is configured to implement a plate condition test while the slide gate valve 2 is moved from the closed configuration to the open configuration. The advantages of such configuration of the controller 8 will be discussed in a further section of this text.

By processing the gas flow measurement data, or the pressure measurement data, and the relative position data of the slide gate valve plates 2u, 2L, 2m, the controller 8 will be able to assess indicators relating to the wear state of the slide gate valve plates 2u, 2L, 2m. The gas flow measured by the flowmeter 7 during the relative displacement of the slide gate valve plates indeed strongly correlates with the amount of gas flowing through the slide gate valve. As already explained supra, with slide gate valve plates in a perfect state (no wear), a fluid can only flow through the slide gate valve when there is at least a partial overlap between the through bores 2b of the sliding valve plates 2u, 2L, 2m. As the through bores 2b of slide gate valve plates in a perfect state have a known diameter, the profile of the gas flow has a shape with a sharp variation at a known relative position of the slide gate valve plates. Such sharp variation of the gas flow is indeed observed at the position at which the through bores 2b start or stop to overlap, depending whether the slide gate valve was initially in a closed gate (sharp increase) or in an open gate configuration (sharp decrease).

Figure 13A:
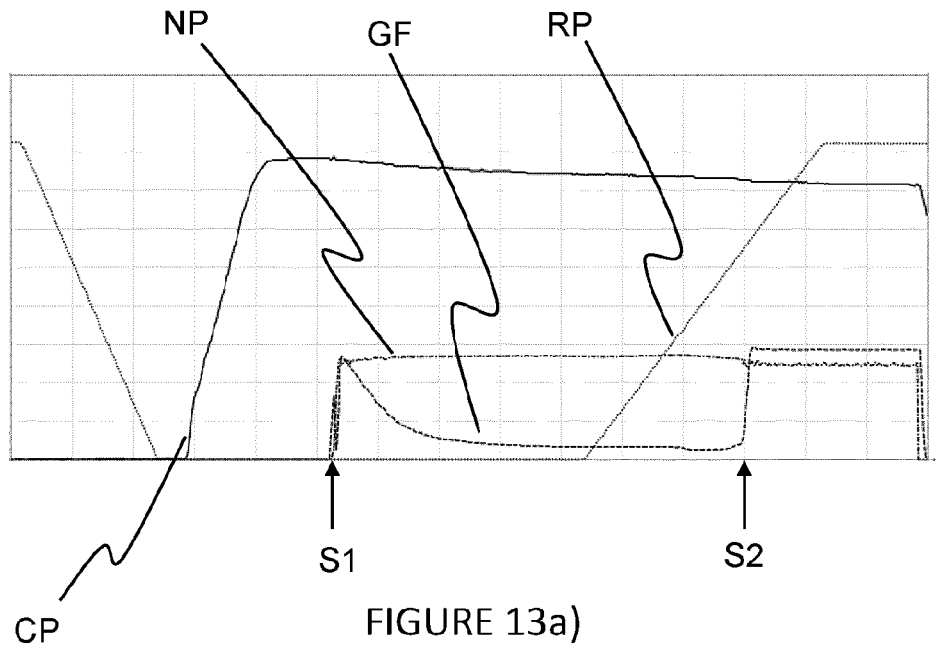
FIGS. 13 a) & b) show graphs of parameters monitored by a plate condition tool according to the invention.

Such sharp variation of the gas flow is illustrated in FIG. 13a) which shows the graph GF of the gas flow with respect to the time variable, when the relative position RP of the slide gate valve plates 2u, 2L, 2m is changed from a closed gate configuration to an open configuration. The initial peak 51 corresponds to the gas flow necessary to raise the pressure in the collector nozzle 2n. The sharp increase S2 in the gas flow corresponds to the relative position of the slide gate valve at which the through bores 2b start to overlap. The graph NP shows the gas pressure monitored by the pressure regulator 6, which reaches its target value of 1.5 bar after the initial gas flow peak 51.

Figure 13B:
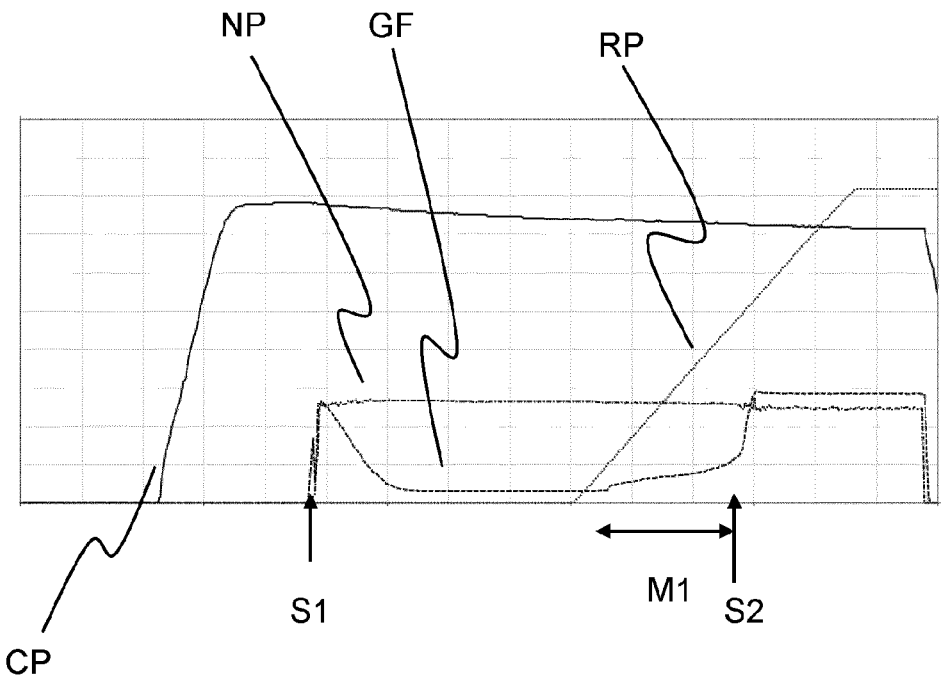
Figure 14:
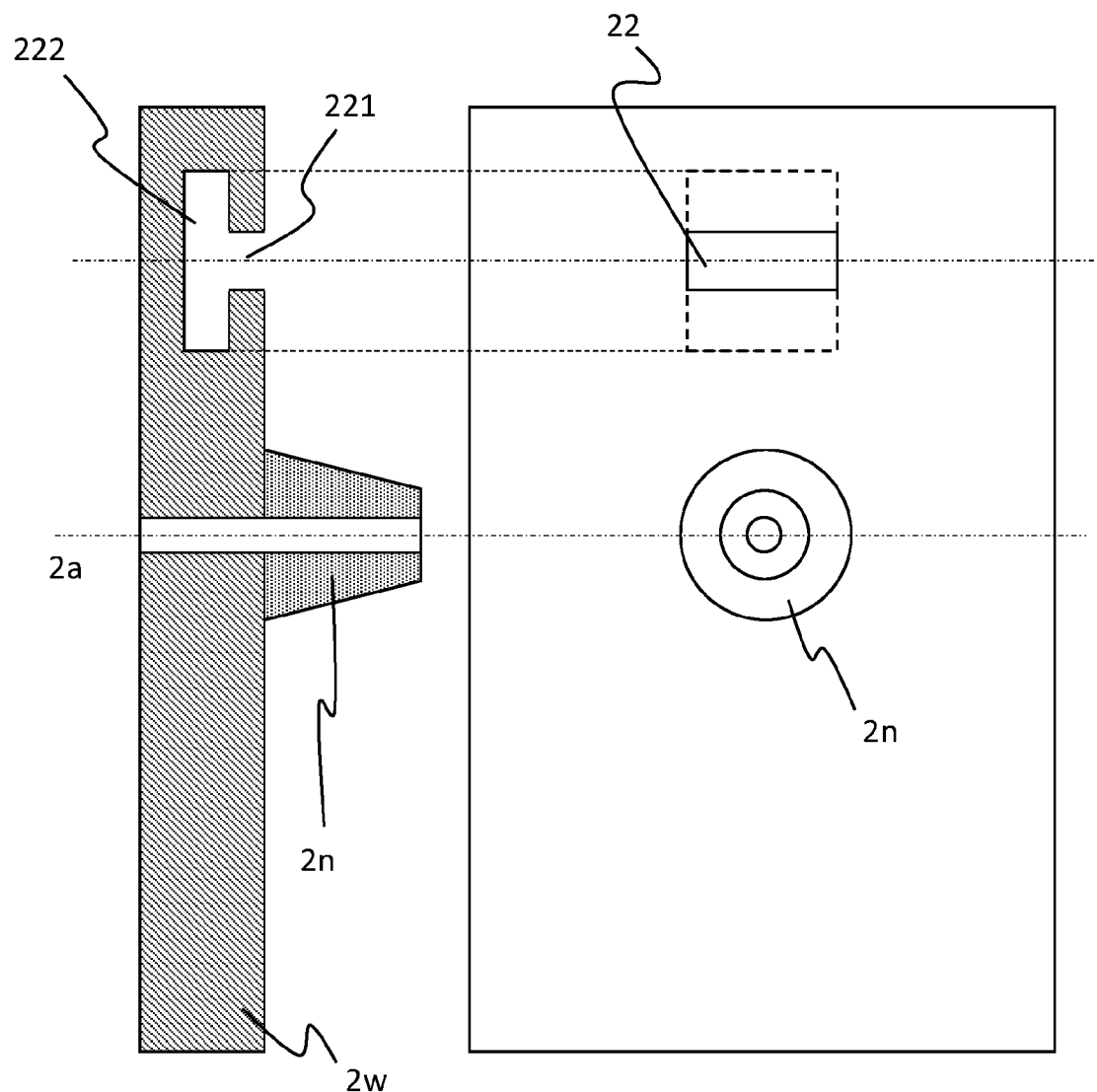
FIG. 14 shows a schematic cross-sectional view and a schematic front view of the front part of a slide gate valve comprising an anchoring passage according to a first embodiment of the invention.

FIG. 13b) shows the same graphs as FIG. 13a) but this time for worn plates. Worn plates are characterized by eroded sliding surfaces 2s and/or enlarged through bores 2b. In the case of eroded surfaces 2s, the sharp increase S2 in the gas flow is preceded by a mild increase M1 reflecting the leakage occurring when the through bores 2b become in fluid communication before they start to overlap. A shift to the left of the sharp increase S2 can also be observed when the worn plates have enlarged through bores 2b. The plate condition tool 3 with its controller 8 will allow to detect and to quantify these alterations of the GF graph.

In one embodiment, the controller 8 can be configured to quantify the leakage due to the erosion of the sliding surfaces 2 by computing the area below the graph GF of the gas flow, or in other words the integral of the gas flow with respect to the time variable. In order to generate a meaningful physical indicator relating to the leakage due to the erosion, such integral will advantageously be put in perspective, e.g. normalized, with the sliding speed of the moving slide gate valve plate during the test, such to generate an erosion leakage indicator. On the other hand, the enlargement of the through bores 2b of the plates can be quantified by assessing the shift of the sharp increase S2. In one embodiment, the position of the sharp increase S2 can be found by computing the derivative of the graph GF of the gas flow and by looking for local maxima of this derivative. A relative position of the slide gate valve plates 2u, 2L, 2m, called the "opening point", can then be associated to this sharp increase S2 by using the graph RP. The controller 8, or a computing device receiving data stored in the controller 8, can be configured to establish that the sliding gate valve plates 2u, 2L, 2m must be replaced ("NO GO" decision) when the leakage due to the erosion exceeds a given threshold and/or when the shift of the sharp increase S2 exceeds a given threshold. Preferably, the controller 8, or a computing device receiving data stored in the controller 8, will establish that the sliding valve plates 2u, 2L, 2m must not be replaced ("GO" decision) when both the leakage due to the erosion and the shift of the sharp increase S2 do not exceed their respective given thresholds. The respective given thresholds can be determined beforehand thanks to numerical simulations and/or experimental measures.

Figure 10:
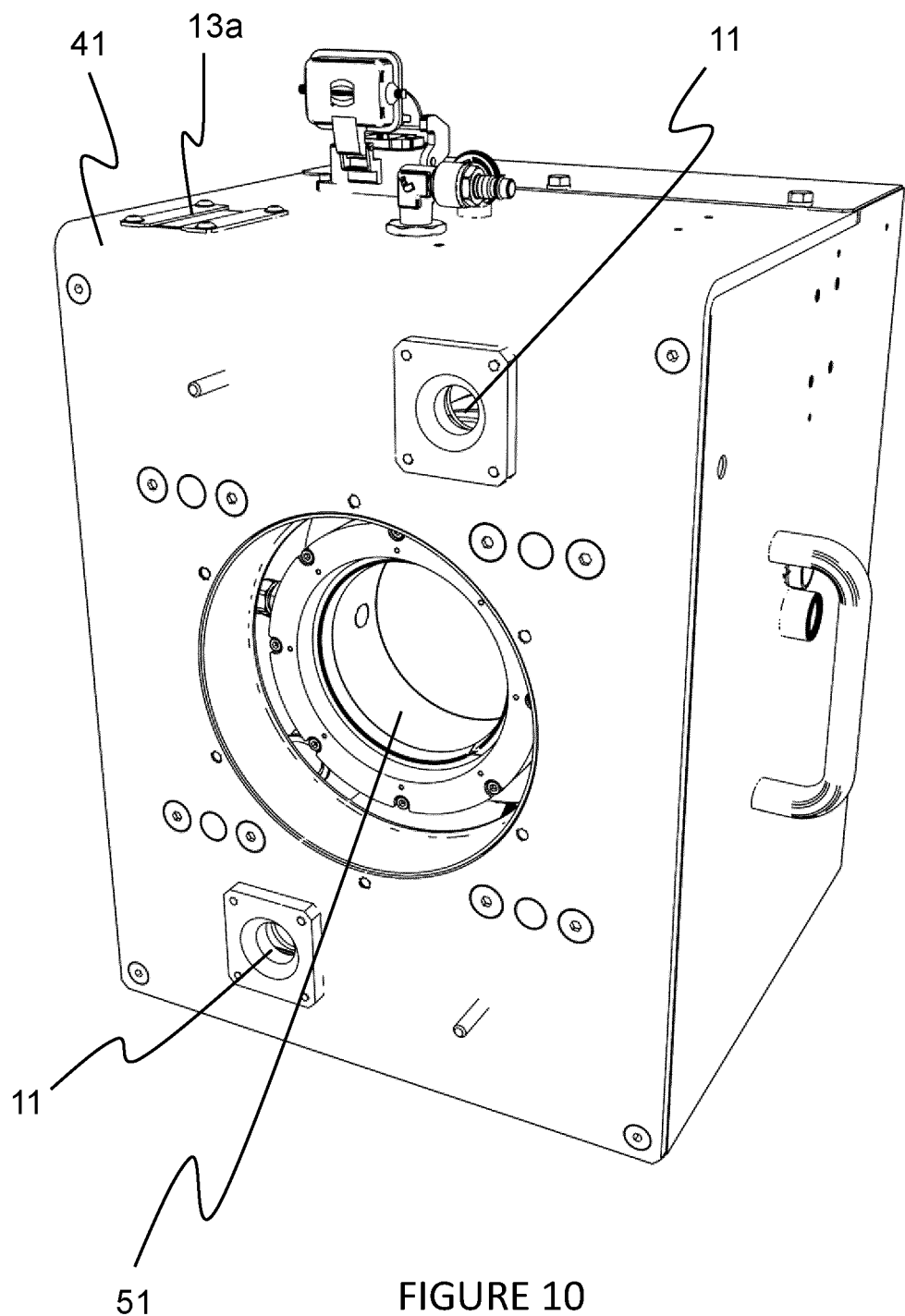
FIG. 10 shows a first perspective view of the exterior of a plate condition tool according to the invention.
Figure 11:
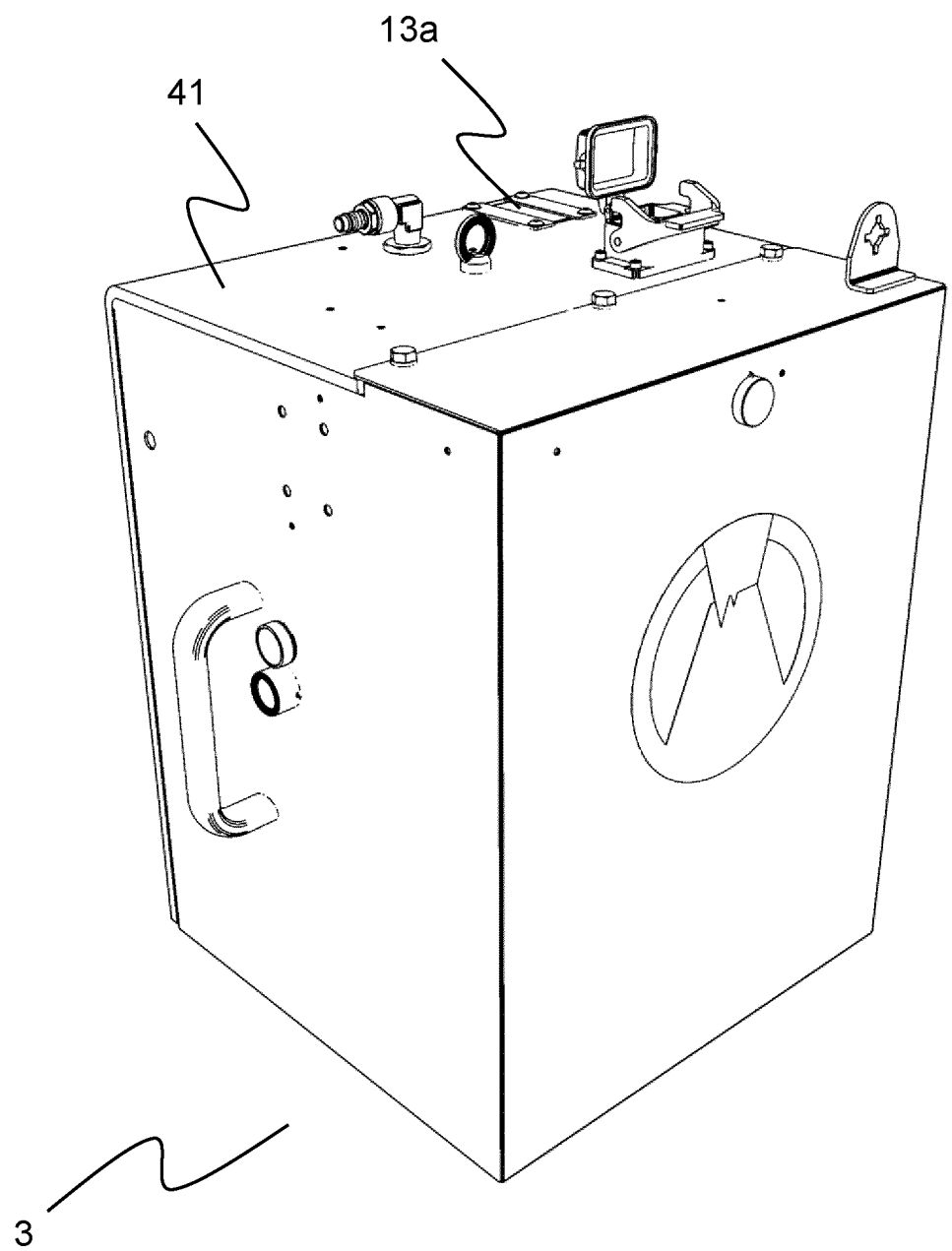
FIG. 11 shows a second perspective view of the exterior of a plate condition tool according to the invention.

In order to generate the graph RP of the relative position of the slide gate valve plates 2u, 2L, 2m, and to extract the physical indicators described supra, the controller 8 must receive an electronic signal related to said relative position. In one embodiment, such electronic signal can be provided by a rangefinder configured to measure the displacement of the moving slide gate valve plate 2L, 2m. Alternatively, such electronic signal can be directly obtained from the control system of the pneumatic or hydraulic piston 27 actuating the movable carriage 21L, 21m of the slide gate valve 2. This implementation is however only advantageous if the control system can determine the position of the moving slide gate valve plate 2L, 2m with a sufficient accuracy. In the embodiment of FIGS. 5-11, the controller 8 is communicatively connected to a rangefinder 13 located in the main body 4 of the plate condition tool 3. The rangefinder 13 is configured to measure the distance to a target located on a fixed part of the metallurgical vessel 1. Such configuration is possible because in FIGS. 1, 3, 5-11, the slide gate valve 2 is of the type of the one described in FIG. 2a). In this type of slide gate valve, the nozzle 2n and the outer surface 2w, advantageously made of a heat shield, are mounted on the movable carriage 21L. As the plate condition tool 3 is coupled to this movable carriage 21L, its displacement relative to a fixed part of the metallurgical vessel 1 corresponds to the relative displacement of the moving slide gate valve plate 2L relative to the fixe slide gate valve plate 2u. In the embodiment of FIGS. 5-11, the rangefinder 13 is a laser triangulation sensor. Alternatively, the rangefinder 13 can be laser time-of-flight sensor or an ultrasound sensor. When such rangefinder 13 is mounted inside the housing 41 of the main body 4, the housing 41 comprises a frame 13a for the passage of the laser beam, as illustrated in FIGS. 10-11.

Figure 21:
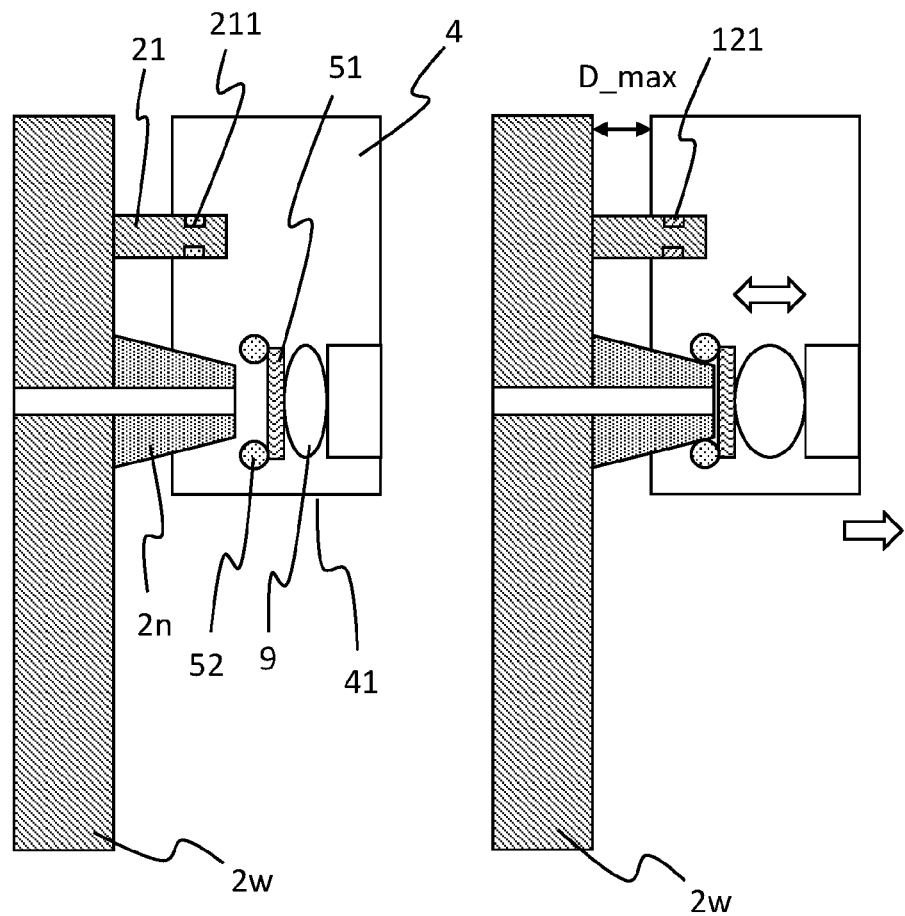
FIG. 21 shows schematic cross-sectional views of a plate condition tool before and after being anchored to a slide gate valve, according to a second embodiment of the invention.
Figure 22:
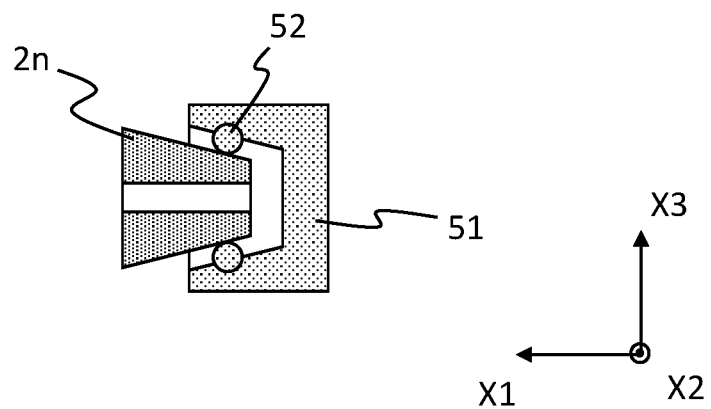
FIG. 22 shows a schematic cross-sectional view of a preferred embodiment for the realization of the seal holder of a plate condition tool according to the invention.

In the embodiments of the plate condition tool 3 illustrated in FIGS. 5-12 and 14-22, the obturator 5 comprises a seal holder 51 for holding a collector nozzle seal 52, which is advantageously ring-shaped and preferably a high temperature resistant seal such that the plate condition tool 3 can be used even when the metallurgical vessel is still at a high temperature, for example shortly after casting operations. The main body 4 of the plate condition tool 3 comprises an anchoring system for being anchored to the metallurgic vessel 1, as illustrated in FIGS. 5-12 and 14-21 or to ground in the vicinity of the metallurgic vessel 1, as illustrated in FIG. 22. It is important to note that, throughout this text, the slide gate valve 2 is considered as an integral part of the metallurgical vessel 1. The anchoring system is configured such that, upon anchoring, a forward axis X1 of the main body 4 is parallel to a first axis X1' of the slide gate valve 2, parallel to a collector nozzle main axis 2a, and in that the distance between a reference point of the main body 4, and the outer wall 2w of the slide gate valve 2 cannot exceed a maximal distance D_max with respect to said slide gate valve first axis X1'. When the slide gate valve 2 is a two-plate sliding gate valve of the type of the one described in FIG. 2a), the main body 4 is advantageously anchored to the bottom plate support frame 21L, which is a movable carriage and which is rigidly coupled to the collector nozzle 2n. In this configuration, the main body 4 will automatically follow the downward or upward motion, relative to axis X3', of the collector nozzle 2n during the sliding motion of the bottom plate support frame 21L and corresponding plate 2L. When the slide gate valve is a three-plate sliding gate, the main body 4 is advantageously also anchored to the bottom plate support frame 21, which is in this case a fixed part of the slide gate valve 2.

Figure 15:
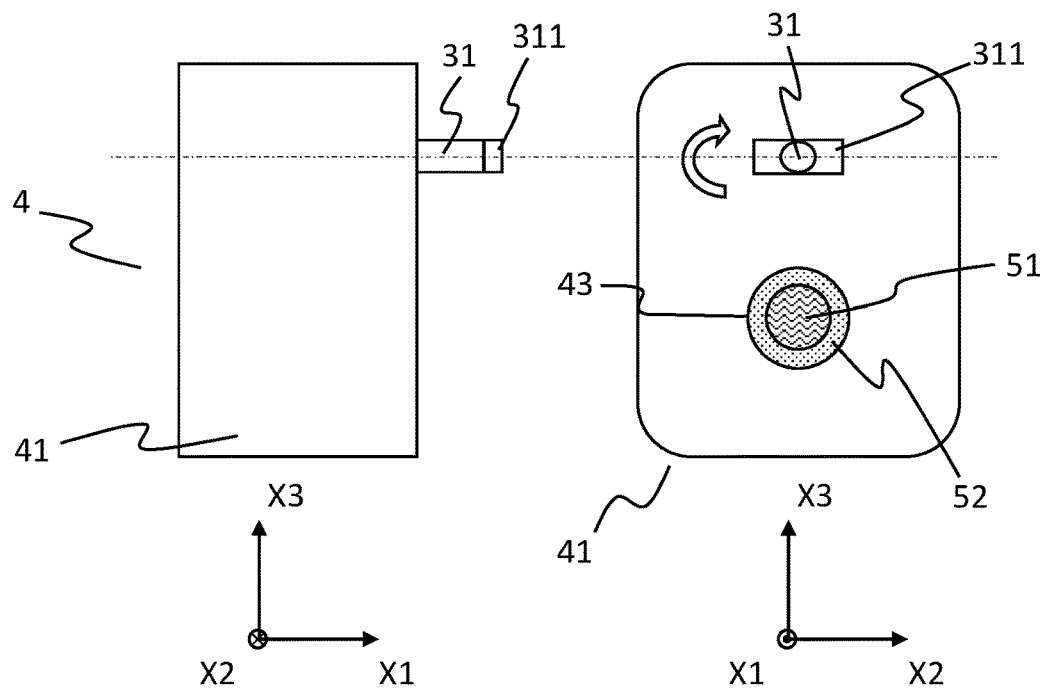
FIG. 15 shows a schematic lateral view and a schematic front view of a plate condition tool according to a first embodiment of the invention with its anchoring head oriented at an angle for being inserted in the anchoring passage of the slide gate valve.
Figure 16:
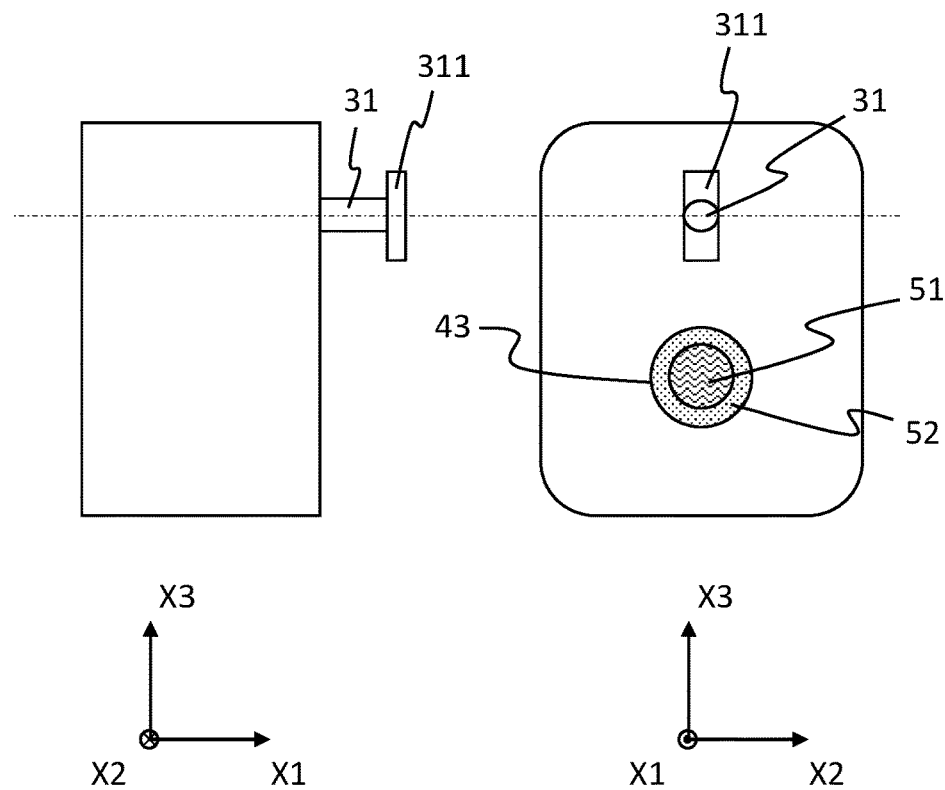
FIG. 16 shows a schematic lateral view and a schematic front view of a plate condition tool according to a first embodiment of the invention with its anchoring head oriented at an angle for being anchored in the anchoring passage of the slide gate valve.
Figure 17:
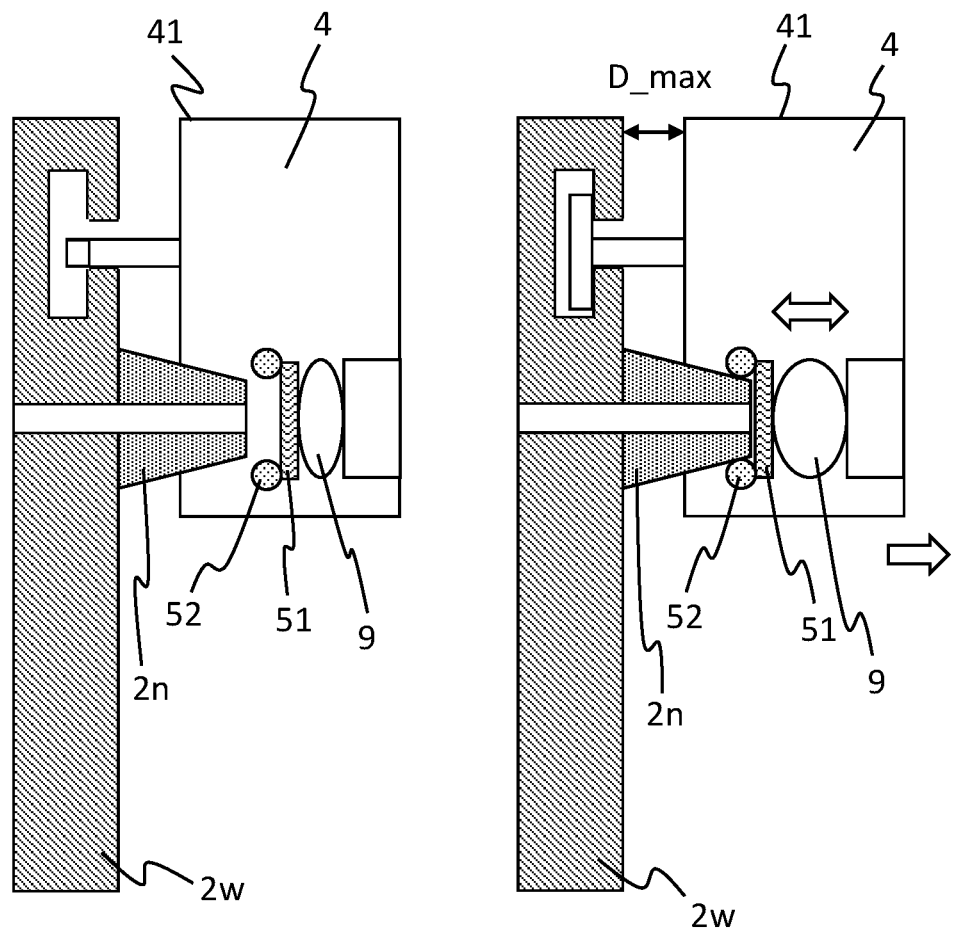
FIG. 17 shows schematic cross-sectional views of a plate condition tool before and after being anchored to a slide gate valve, according to a first embodiment of the invention.
Figure 18:
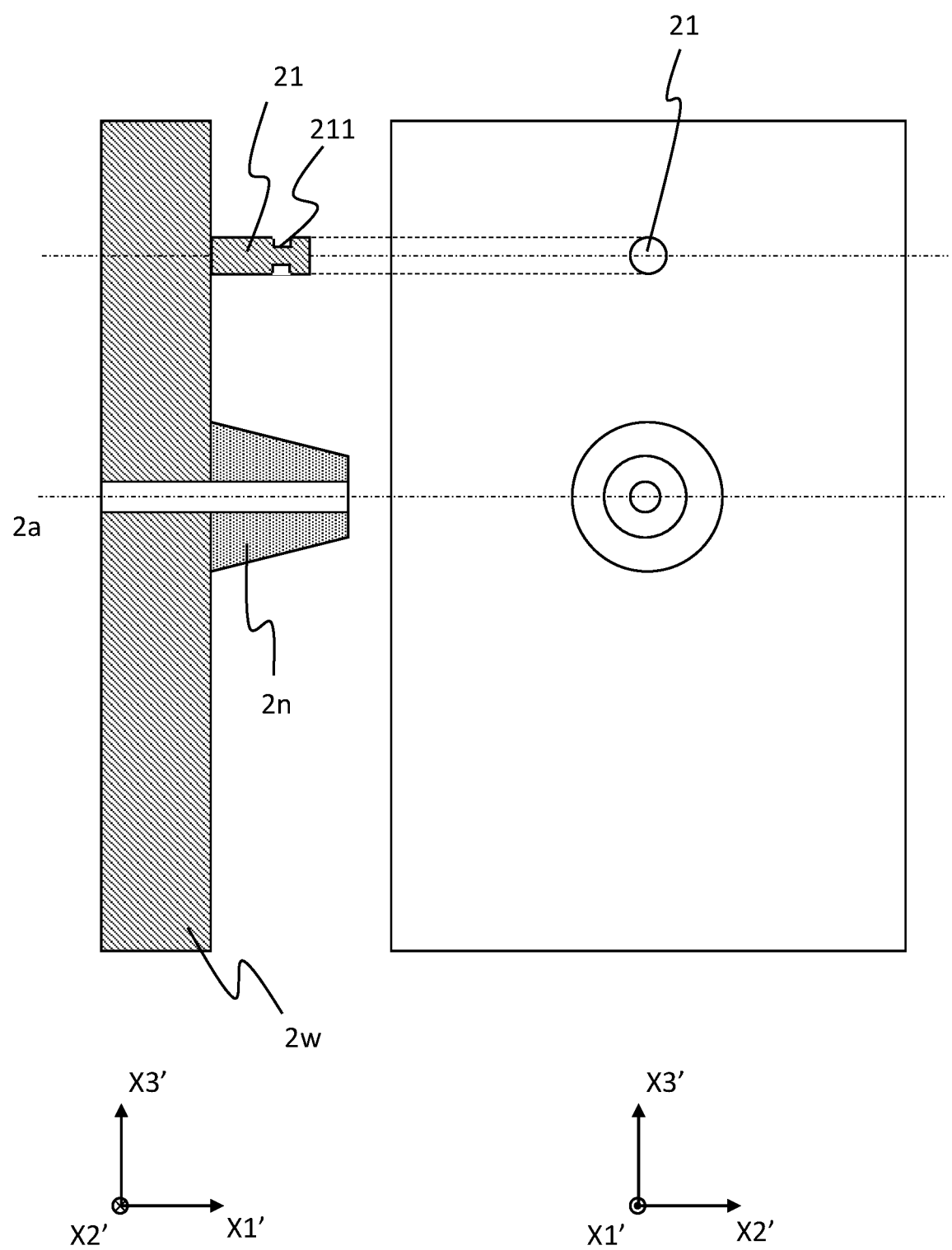
FIG. 18 shows a schematic cross-sectional view and a schematic front view of the front part of a slide gate valve comprising an anchoring rod according to a second embodiment of the invention.
Figure 19:
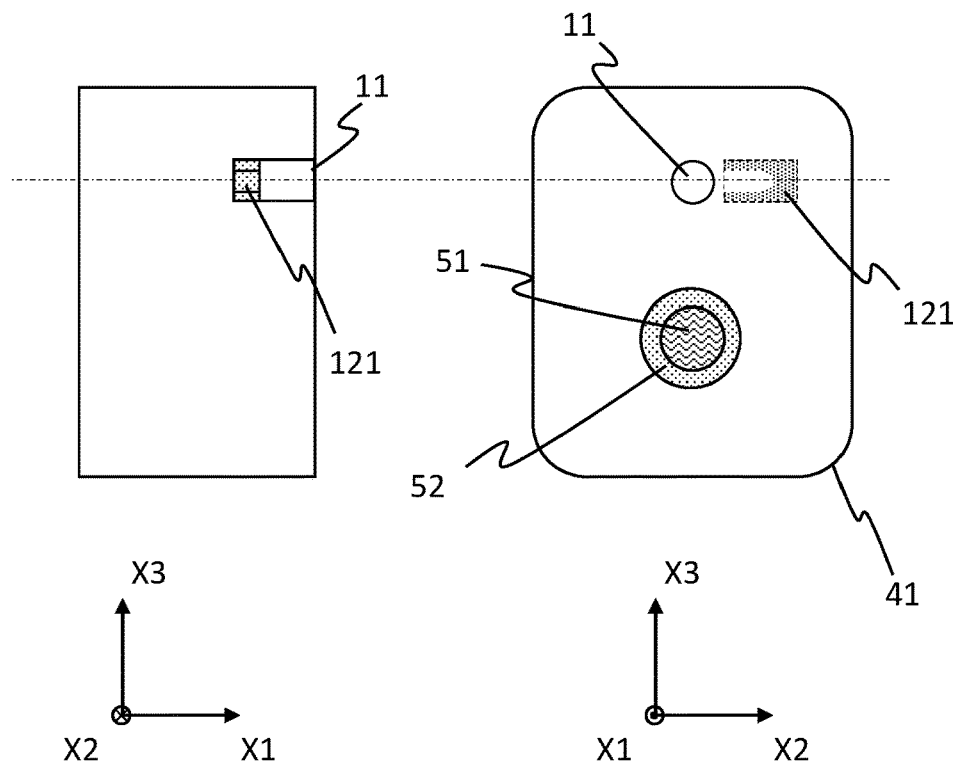
FIG. 19 shows a schematic lateral view and a schematic front view of a plate condition tool according to a second embodiment of the invention with its locking fork at a position for receiving the anchoring rod of the slide gate valve in the anchoring passage of the plate condition tool.
Figure 20:
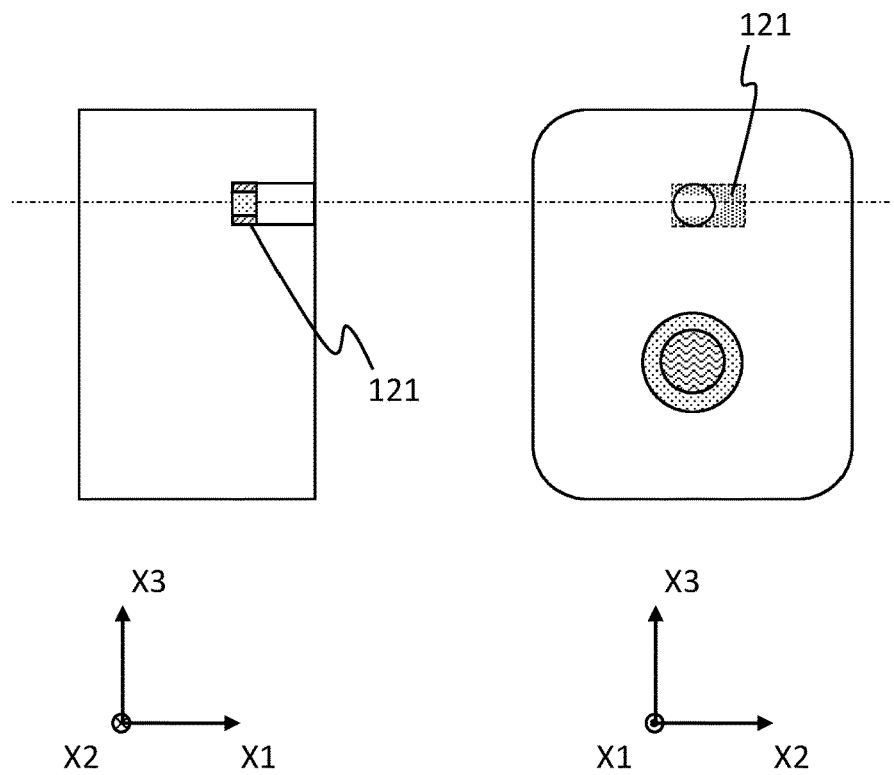
FIG. 20 shows a schematic lateral view and a schematic front view of a plate condition tool according to a second embodiment of the invention with its locking fork at a position for locking the anchoring head of the coupling rod of the slide gate valve in the anchoring passage of the plate condition tool.

In the embodiments of FIGS. 14-17, the anchoring system of the plate condition tool 3 comprises an anchoring rod 31 extending along the forward axis X1 of the main body 4. The anchoring rod 31 comprises a proximal end, rigidly coupled to the main body 4, and a distal end. At the distal end is mounted a rotatable anchoring head 311. The rotatable anchoring head 311 is rotatable about the forward axis X1 of the main body 4. The anchoring system of such plate condition tool 3 is configured to be anchored to the outer wall 2w of the slide gate valve 2 represented in FIG. 14. The outer wall 2w of such slide gate valve 2 comprises an anchoring passage 22 for receiving the anchoring rod 31. The passage 22 comprises an entry portion 221 and a bottom portion 222. The cross section in the X2'X3' plane of the bottom portion 222 is larger than and encompasses the cross section in the X2'X3' of the entry portion 221. The cross section in the X2'X3' plane of the entry portion 221 has a shape such that the anchoring rod 31 can be inserted in the passage 22 when its rotatable anchoring head 311 is oriented at an insertion angle about axis X1, as represented in FIG. 15, for coupling the plate condition tool 3 the slide gate valve 2. When the rotatable anchoring head 311 is oriented at the insertion angle about axis X1, the plate condition tool 3 can be coupled to the slide gate valve 2 by a translation along axis X1' with respect to the slide gate valve 2 while its axes X2 and X3 are kept substantially parallel to axes X2' and X3' of the slide gate valve 2. When the anchoring rod 31 has been inserted in the passage 22 up to a depth wherein the anchoring head 311 reaches the bottom portion 222, the anchoring head 311 can be rotated to the anchoring angle, as represented in FIG. 16. The cross section in the X2'X3' plane of the bottom portion 222 has thus a shape such that the anchoring head 311 can be rotated from the insertion angle to the anchoring angle about axis X1. On the other hand, the cross section in the X2'X3' plane of the entry portion 221 has a such a shape such that when the anchoring head 311 is in the bottom portion 222 and is oriented at the anchoring angle, the plate condition tool 3 is anchored to the slide gate valve 2 in that the distance between a reference point of the main body 4 and a reference point of the outer wall 2w of the slide gate valve plate 2 cannot exceed a maximal distance D_max with respect to the slide gate valve first axis X1', as represented in FIG. 17.

In the embodiments represented in FIGS. 5-22, the front wall of the housing 41 comprises advantageously a through hole 43 for receiving the collector nozzle 2n of the slide gate valve 2 when the plate condition tool 3 is anchored to the slide gate valve 2. The through hole 43 is therefore located in the front wall of the housing 41 at a position with respect to the axes X2 and X3 of the main body 4 wherein it faces the collector nozzle 2n in the plane X2'X3' of the slide gate valve 2 when the plate condition tool 3 is anchored to the slide gate valve 2.

In the embodiment represented in FIGS. 5-22, a mechanical actuator, such as a closed inflatable chamber 9, is coupled to the main body 4 and to the seal holder 51. As represented in FIGS. 17 & 21, the mechanical actuator is configured to move the seal holder 51 relative to the main body 4, at least along the transverse axis X1 of the main body 4, for pressing the collector nozzle seal 52 against the collector nozzle 2n when the main body 4 is anchored and is located at the maximal distance D_max from the outer wall 2w. Pressing the high temperature resistant seal 52 against the collector nozzle 2n allows to obturate the collector nozzle 2n. In the embodiments illustrated in FIGS. 5-22, the mechanical actuator is a closed inflatable chamber 9 which can be inflated to a variable pressure, and which is placed between the seal holder 51 and a backing wall of the main body 4. Alternatively, instead of a closed inflatable chamber 9, the mechanical actuator can be a regular linear actuator. In order to obturate the collector nozzle 2n, the inflatable chamber 9 is consequently inflated by a gas under pressure, such to exert a sufficient force to move the seal holder 51 toward the collector nozzle 2n along the transverse axis X1. The inflatable chamber 9 will eventually press the collector nozzle seal 52 held by the seal holder 51 against the collector nozzle 2n, before causing a potential rearward motion of the main body 4 relative to the slide gate valve 2, in the positive direction of the axis X1' and up to the maximal distance D_max. At this moment, the force exerted by the inflatable chamber 9 on the seal holder 51 becomes dedicated to the sealing of the collector nozzle seal 52 against the collector nozzle 2n. The obturation of the collector nozzle 2n by a seal holder 51 and a mechanical actuator, such as an inflatable chamber 9, is advantageous because the sealing is a straightforward and reliable step, easily implemented by an operator or a robot manipulating the plate condition tool 3. Contrary to a chemical sealing, for example with a cement, the use of this seal holder and the mechanical actuator is furthermore a clean and reversible step.

In the embodiments of FIGS. 5-12 and 18-21, the anchoring system comprises at least one through hole 11 in the front wall of the housing 41. Such at least one through hole 11 is configured such that it can receive a pin 21 jutting out of the outer wall 2w of the slide gate valve 2. The plate condition tool 3 comprises at least one locking mechanism 12 inside the housing 41 wherein a coupling element, such as a locking fork 121, is mechanically actuatable along an axis X2 perpendicular to the transverse axis X1. The coupling element 121 has advantageously a concave profile in the plane X2X3 perpendicular to the axis X1 such that it can be secured in in an annular groove 211, located in the outer surface of a corresponding pin 21, when it is moved by an actuator along the axis X2 toward said pin 21. Alternatively, instead of an annular groove 211, the corresponding pin 21 can comprise a linear upper groove and a linear lower groove, wherein these linear grooves are parallel to the axis X2. Alternatively, instead of grooves, the pin 21 can comprise a portion with a reduced cross section in the X2'X3' plane, compared to the cross section of the distal end of the pin 21, in that the distal end is shaped as an anchoring head of said pin 21. Once the concave profile of the coupling element 121 is secured in the annular groove 211, or in the linear grooves of the pin 21, or in the portion with a reduced cross section of the pin 21, the main body 4 of the plate condition tool 3 is anchored to the slide gate valve 2 in that the distance between a reference point of the main body 4, and the outer wall 2w of the slide gate valve 2 cannot exceed a maximal distance D_max with respect to said slide gate valve first axis X1'. In the embodiment of FIGS. 5-12, the anchoring system comprises two through holes 11 in the front wall of the housing 41, and corresponding locking forks 121, for receiving two pins 21 jutting out of the outer wall 2w of the slide gate valve 2. The outer wall 2w of the slide gate valve 2 can be made of a heat shield which can be fixed to the front wall of the slide gate valve, as illustrated in the embodiment of FIG. 5. The present invention thus also relates to kit of parts comprising (i) a heat shield for a slide gate valve 2, wherein said heat shield comprises a through hole for receiving the collector nozzle 2n and an outer surface comprising at least one pin 21, and (ii) a plate condition tool 3 according to the present invention, wherein the anchorage system of the plate condition tool 3 comprises at least one locking mechanism 12 configured to be secured to the at least one the pin 21, as described supra. Alternatively, instead of the pin 21, the heat shield can comprise a passage 22. The plate condition tool comprises then an anchoring rod 31, such as discussed supra and illustrated in the embodiment of FIGS. 14-17.

In FIG. 22, a preferred embodiment for the realization of the seal holder 51 of the plate condition tool 3 is represented. In this preferred embodiment, the seal holder 51 has an inner wall with a frustoconical cross section in the X1X3 plane of the main body 4, wherein the collector nozzle seal 52 is mounted to this inner wall. Such frustoconical cross section of the inner wall is advantageous in that it can automatically compensate for minor misalignments of the seal holder 51 relative to the collector nozzle 2*n* in the X2'X3' plane of the slide gate valve 2 when moving the seal holder 51 for pressing the collector nozzle seal 52 against the collector nozzle 2*n*. It can also advantageously compensate for minor misalignments of the axis X1 of the plate condition tool 3 with the axis X1' of the slide gate valve 2 when moving the seal holder 51 for pressing the collector nozzle seal 52 against the collector nozzle 2*n*. This frustoconical shape does indeed allows to achieve a self-centering of the seal holder 51 and collector nozzle seal 52 on the collector nozzle 2*n* when the seal holder is translated toward the collector nozzle 2*n* along the axis X1'.

Figure 23:
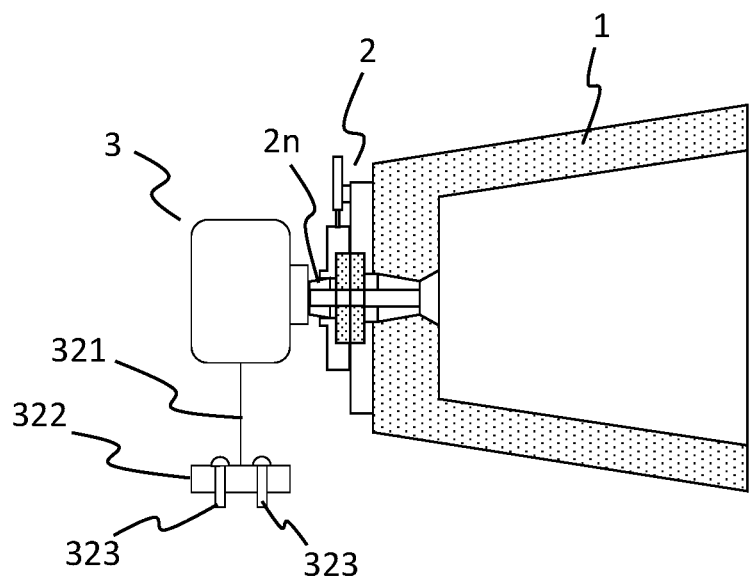
FIG. 23 shows a schematic cross-sectional view of a plate condition tool to the ground in the vicinity of the metallurgical vessel, according to a third embodiment of the invention.

In FIG. 23, another embodiment of a plate condition tool according to the invention is represented. In this embodiment, the anchoring system comprises a leg 321 for supporting the main body 4. The leg is advantageously rigidly coupled to a support base 322 being fixed to the ground in the vicinity of the metallurgical vessel 1, thanks to fastening means such as bolts 323. The leg 321 is advantageously adjustable in height, such that the height can be finely tuned to an appropriate magnitude for the plate condition tool 3 to be coupled to the slide gate valve 2 of the metallurgical vessel 1 lying on its side. The present invention also relates to a kit of parts comprising (i) a plate condition tool 3, and (ii) an anchoring system comprising a leg 321, a support base 322 and fastening means 323 for fixing the support base 322 to the ground.

As illustrated in FIGS. 6-9, resilient elements, such as helical springs 10 working in extension, can be used in the main body 4 to exert a restoring force against the expansion of the closed inflatable chamber 9. The restoring force from the resilient element helps the seal holder 51 to recover its initial uninflated configuration when the pressure is lowered in the inflatable chamber 9, for example because the plate condition test implemented by the plate condition tool 3 is finished. The role of the resilient elements is to avoid that the high temperature resistant seal remains stuck against a hot collector nozzle 2*n*.

Figure 12A:
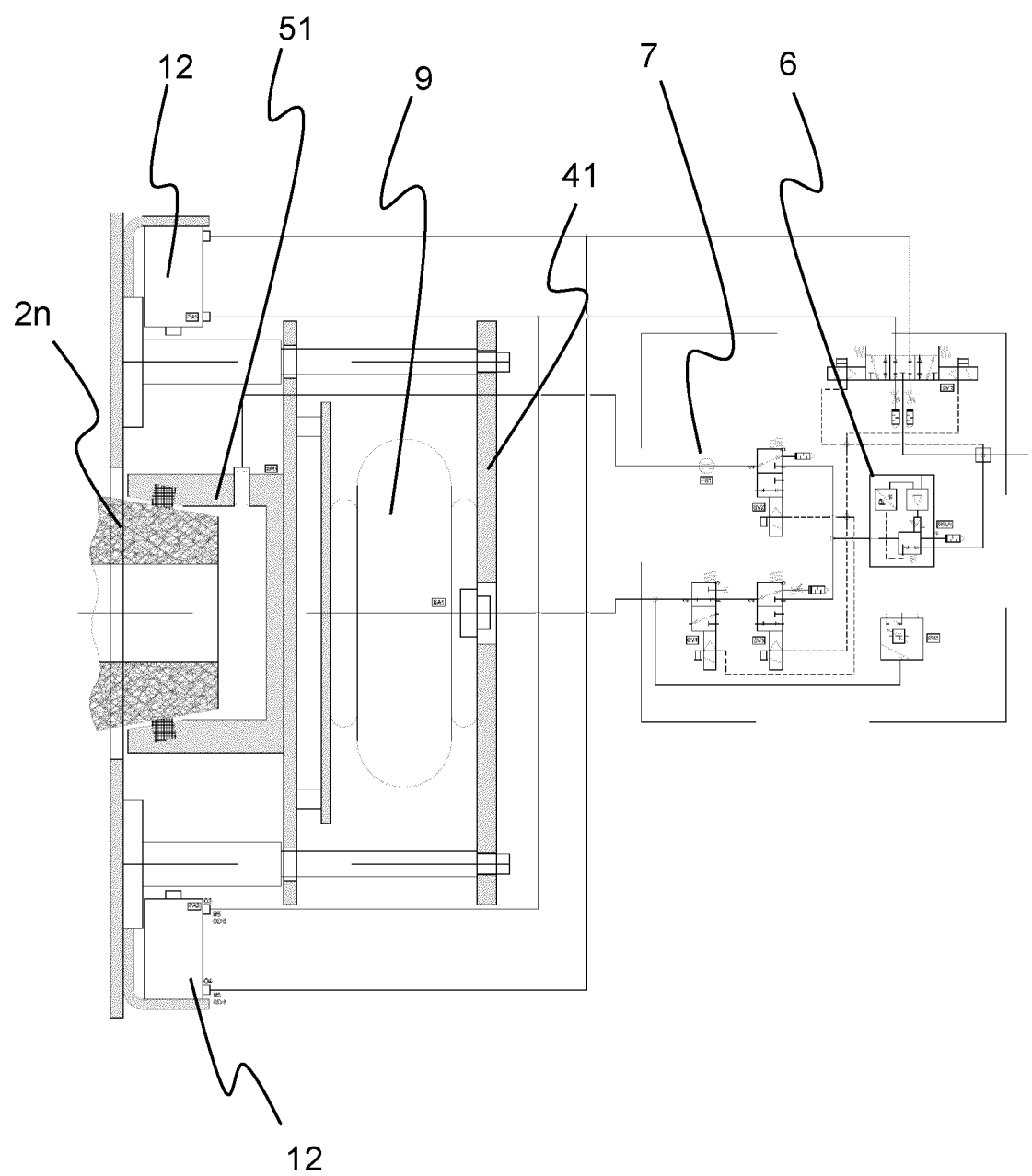
FIG. 12a) shows the pneumatic circuit formed by a plate condition tool according to the invention and the collector nozzle of a slide gate valve.

In an advantageous embodiment, the pressure regulator 6 of the plate condition tool 3 is configured to also supply in high pressure gas the inflatable chamber 9. To this end, a pneumatic circuit, illustrated in FIGS. 12*a*) & *b*), can be implemented in the plate condition tool 3. Such pneumatic circuit comprises a plurality of valves, such as solenoid valves SV2, SV3, SV4. The solenoid valve SV2 is fitted between the output 6*s* of the pressure regulator 6 and the seal holder 51 such to control the flow of high-pressure gas between the pressure regulator 6 and the collector nozzle 2*n*. The valve SV2 can be in a first state wherein collector nozzle 2*n* is connected to an exhaust filter (idle state), as represented in FIGS. 12*a*) & *b*). In a second state of valve SV2, the collector nozzle 2*n* is connected to the output 6*s* of the pressure regulator 6, with the flowmeter 7 placed between them.

Solenoid valves SV3 and SV4 are placed in series between the output 6*s* of the pressure regulator 6 and the inflatable chamber 9. When valves SV3 and SV4 are respectively in their first state, as represented in FIGS. 12*a*) & *b*), the inflatable chamber 9 is connected to an exhaust filter (idle state). When valve SV3 moves to its second state, and valve SV4 remains in its first state, the inflatable chamber 9 becomes connected to the output 6*s* of the pressure regulator 6. This configuration is used to inflate the inflatable chamber 9 when the seal holder 51 needs to be moved toward the collector nozzle 2*n* and perform the sealing thanks to its collector nozzle seal 52. When a sufficient pressure is reached in the inflatable chamber 9 to perform the sealing, valve SV4 can be moved to its second state, such to close the pneumatic circuit of the inflatable chamber 9. An auxiliary pressure gauge 14 is advantageously configured to measure the pressure in the inflatable chamber 9. The pressure gauge 14 will allow to monitor the pressure in the inflatable chamber 9, even when said inflatable chamber is disconnected from the pressure regulator 6 by the valve SV4. Such pressure gauge 14 can be used to check that there is no substantial pressure variation in the inflatable chamber 9 after it has been closed, which would indicate a potential leak or another defect in the inflatable chamber 9. The pressure gauge 14 is advantageously communicatively connected to the controller 8. The controller 8 can then receive the values of the pressure in the inflatable chamber 9 at successive time steps during a plate condition test. The graph CP of pressure values in the inflatable chamber 9 is represented at FIGS. 13*a*) & *b*), together with the other parameters monitored by the controller 8.

Figure 12B:
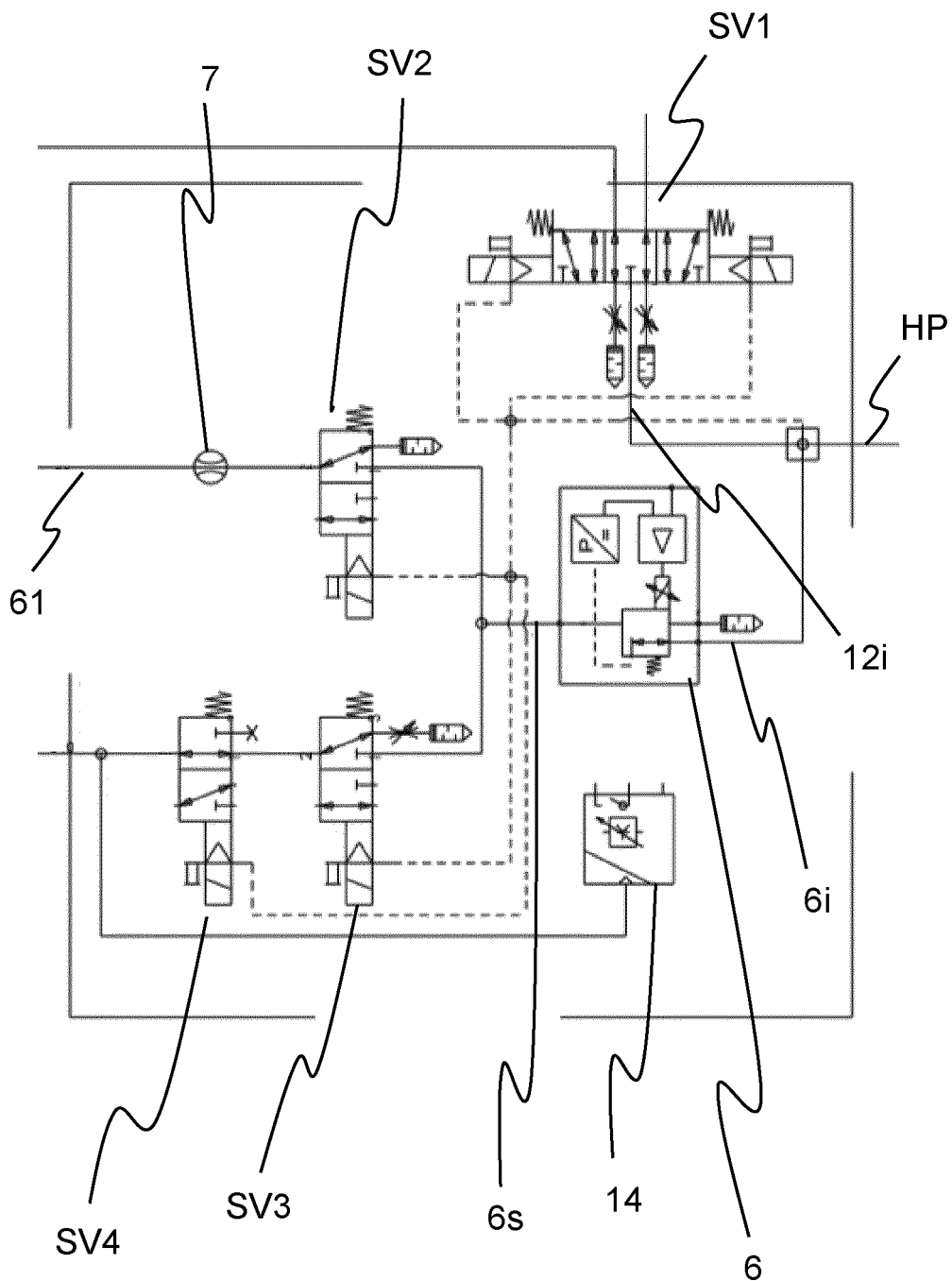
FIG. 12b) shows an enlarged view the pneumatic circuit formed by the plate condition tool of FIG. 12a)

In an advantageous embodiment, the locking mechanisms 12 of the anchorage system are pneumatically actuated. The pressure regulator inlet 6*i* and the anchorage system inlet 12*i* are then advantageously fitted to a same high-pressure supply HP, as illustrated in FIG. 12*b*). In this embodiment, the anchorage system comprises advantageously a solenoid valve SV1 with three states for supplying double acting cylinders in the locking mechanisms 12.

The present invention relates also to a method implemented by the plate condition tool 3 for the measurement of condition data of slide gate valve plates 2*u*, 2L, 2*m* comprising the step of:

Obturating the collector nozzle 2*n* of a slide gate valve 2 with an obturator 5;

Operating a gas injecting device such to reach a target pressure in the collector nozzle 2*n*;

Measuring the flow of the gas injected by the gas injecting device during a time interval;

Moving the slide gate valve 2 from a closed to an open configuration, or from an open to a closed configuration, during said time interval;

Measuring the relative position of the slide gate valve plates 2*u*, 2L, 2*m* during said time interval;

Computing condition indicators of the slide gate valve plates 2*u*, 2L, 2*m*, such as the erosion leakage indicator or the opening point indicator discussed above;

Comparing said condition indicators to ideal value of said condition indicators corresponding to slide gate valve plates in a perfect state and issuing accordingly a "GO" or "NO GO" decision for said slide gate valve plates 2*u*, 2L, 2*m*.

In preferred implementation of the method, the slide gate valve 2 is moved from a closed to an open configuration. This will indeed allow to implement a preliminary step for assessing the quality of the obturation of the collector nozzle 2*n* by the obturator 5.

In a preferred implementation of the method, a "GO" decision is issued when the difference between both the erosion leakage indicator and the opening point indicator and their respective ideal values do not exceed respective predetermined thresholds.

The present invention relates also to a method for operating the plate condition tool 3. In the method according to the invention, the plate condition tool 3 is operated to implement a plate condition test while the slide gate valve 2 is moved from the closed configuration to the open configuration. This method, used to generate the graphs of FIGS. 13a) & b), is advantageous because it allows to check the quality of the sealing between the obturator 5 and the collector nozzle 2n. The residual gas flow measured by the gas flow measuring device 7 shortly after the initial peak S1 in the GF graph provides indeed a good indicator of the quality of the sealing between the obturator 5 and the collector nozzle 2n. When the value of the residual gas flow exceeds a given threshold, the plate condition tool 3 is advantageously configured to send an alert signaling that there is a malfunction of the sealing between the obturator 5 and collector nozzle 2n.

When the obturator 5 comprises a movable seal holder 51 actuatable such to exert a force of variable magnitude on a high temperature seal against the collector nozzle 2n, the following preliminary step for the adjustment of the sealing is advantageously implemented in the method according to the invention, said preliminary step comprising:

Operating the mechanical actuator such to press the collector nozzle seal against the collector nozzle 2n;

Operating the gas injecting device such to reach a target pressure in the collector nozzle 2n;

Measuring the residual gas flow necessary to maintain such target pressure in the collector nozzle 2n;

Increasing the force applied by the mechanical actuator if the residual gas flow measured exceeds a given threshold.

Such preliminary step can be implemented several times until the residual gas flow drops down below the given threshold and the sealing between the obturator 5 and the collector nozzle 2n is then considered as sufficient.

If the residual gas flow does not drop down below the given threshold after several preliminary steps as described above, the plate condition tool 3 is then advantageously configured to send an alert signaling that there might be defect in the collector nozzle 2n or in the high temperature seal.

A seal checking step for checking the condition of the collector nozzle seal 52 can be implemented, wherein said seal checking step comprises:

Operating the mechanical actuator such to press collector nozzle seal 52 against a replica in a perfect state of the collector nozzle 2n, mounted on a closed cavity;

Operating the gas injecting device such to reach a target pressure in the replica of the collector nozzle 2n;

Measuring the residual gas flow necessary to maintain such target pressure in the replica the collector nozzle 2n;

Increasing the force applied by the mechanical actuator if the residual gas flow measured exceeds a given threshold.

Such seal checking step can be implemented several times until the residual gas flow drops down below the given threshold and the collector nozzle seal is then considered as being in good condition. The plate condition tool 3 is then advantageously configured to send an alert signaling that there is a defect in the collector nozzle 2n of the slide gate valve 2.

If the residual gas flow does not drop down below the given threshold after several seal checking steps as described above, the plate condition tool 3 is then advantageously configured to send an alert signaling that there is a defect in the high temperature seal.

The invention claimed is:

1. A plate condition tool for measurement of condition data of slide gate valve plates coupled to the slide gate valve of a metallurgic vessel, said slide gate valve comprising:
    a collector nozzle protruding from an outer wall of said slide gate valve along a collector nozzle main axis parallel to a slide gate valve first axis X1', said slide gate valve first axis XI' defining an orthonormal frame of reference together with slide gate valve second axis X2' and third axis X3',
    said slide gate valve being able to switch between an open and a closed configuration by sliding at least two slide gate valve plates with respect to one another,
    said collector nozzle being in fluid communication with a casting channel of said metallurgic vessel when said slide gate valve is in the open configuration,
    said plate condition tool comprising:
    a) a main body comprising an obturator for obturating at least partially the collector nozzle;
    b) a gas injecting device comprising a pressure regulator for injecting a gas in the collector nozzle through the obturator at a target pressure;
    c) a gas flow measuring device for measuring the flow of the gas injected by the gas injecting device or a pressure measuring device for measuring gas pressure in the collector nozzle;
    d) a controller being communicatively connected to the gas flow measuring device or to the pressure measuring device and being configured to receive input data relating to the relative position of the slide gate valve plates,
    wherein the obturator comprises a seal holder for holding a collector nozzle seal,
    said seal holder being movable relative to said main body at least along a forward axis XI of said main body,
    said forward axis defining an orthonormal frame of reference of said main body together with main body second axis X2 and third axis X3,
    and wherein:
    i) the plate condition tool comprises an anchoring system for anchoring the main body to an anchoring portion of the metallurgic vessel or to ground in a vicinity of the metallurgic vessel, in that a distance between a reference point of the main body and a reference point of the outer wall of the slide gate valve cannot exceed a maximal distance D max with respect to said slide gate valve first axis C when said main body is displaced relative to the slide gate valve along said slide gate valve first axis C,
    ii) the anchoring system is configured such that when the main body is anchored to the metallurgical vessel or to the ground in the vicinity of the metallurgical vessel, the seal holder faces the collector nozzle in a plane X2'X3' of the slide gate valve in that the collector nozzle seal can be pressed along the forward axis XI of the main body against the collector nozzle for obturating said collector nozzle; and,
    iii) the plate condition tool comprises a mechanical actuator, said mechanical actuator being coupled to main body and to the seal holder, said mechanical actuator being configured to move the seal holder relative to the main body, at least along said forward axis XI of the main body, such to press the collector nozzle seal against the collector nozzle when (a) the main body is anchored to the metallurgic vessel or to the ground in the vicinity of the metallurgic vessel, and (b) is located at the maximal distance D max.

2. The plate condition tool according to claim 1 wherein the anchoring system comprises at least one anchoring rod extending along the forward axis XI of the main body, said anchoring rod comprising a distal end and a proximal end, said proximal end being fixed to the main body, said anchoring rod comprising a rotating anchoring head at its distal end, said anchoring head being rotatable about the forward axis XI of the main body for being anchored in an anchoring passage of the slide gate valve.

3. The plate condition tool according to claim 1 wherein the anchoring system comprises at least one through hole in a front wall of a housing of the main body for receiving a pin jutting out of the outer wall (2w) of the slide gate valve, said pin comprising at least one groove in is outer surface, said anchoring system comprising a coupling element inside the housing, said coupling element comprising a concave profile in a plane X2X3 and being movable in translation along at least one of said axes X2, X3 of the main body, in that the coupling element can be moved up to a position wherein its concave profile can be secured in the at least one groove of the pin after said pin has been inserted in the through hole.

4. The plate condition tool according to claim 1 wherein the anchoring system comprises a leg for supporting the main body, said leg being adjustable in length and being rigidly coupled to a support base, and wherein the anchoring system comprises fastening means for fastening the support base to the ground in the vicinity of the metallurgical vessel.

5. The plate condition tool according to claim 1, wherein the mechanical actuator comprises a closed inflatable chamber with a deformable wall, wherein the closed inflatable chamber can be inflated to a variable pressure, said closed inflatable chamber being placed between the seal holder and a backing wall of the main body.

6. The plate condition tool according to claim 5, wherein resilient elements are positioned in the main body such to exert a restoring force against an expansion of the closed inflatable chamber.

7. The plate condition tool according to claim 1, wherein it comprises a gas flow measuring device for measuring the flow of the gas injected by the gas injecting device and the controller is configured to store in a memory of said controller the gas flow (GF) necessary to reach the target pressure and the relative position (RP) of the slide gate valve plates as functions of a time variable.

8. The plate condition tool according to claim 7, wherein the controller is configured to process the gas flow (GF) function such to extract a first indicator by computing a derivative of said function and a second indicator by computing an integral of said function.

9. The plate condition tool according to claim 1, wherein the controller is communicatively connected to the pressure regulator.

10. The plate condition tool according to claim 1, wherein the controller is configured to control the relative sliding motion of the slide gate valve plates.

11. The plate condition tool according to claim 1, wherein it comprises a rangefinder, said rangefinder being mounted on the main body and being configured to measure the distance with respect to the slide gate valve third axis X3' between said rangefinder and a target mounted on a fixed part of the metallurgic vessel when said plate condition is anchored to said slide gate valve, said rangefinder being communicatively connected to said controller.

12. A kit of parts comprising a plate condition tool according to claim 1 and a slide gate valve, wherein the anchoring system anchors to an anchoring portion of said slide gate valve.

13. The kit of parts according to claim 12 comprising a plate condition tool according to claim 1 and a slide gate valve, wherein the anchoring system of the plate condition tool anchors to at least one anchoring passage in the outer wall of said slide gate valve, said at least one anchoring passage comprising an entry portion and a bottom portion, wherein a cross section in the plane X2'X3' of the bottom portion is larger than and encompasses a cross section in the plane X2'X3' of the entry portion.

14. The kit of parts according to claim 12 comprising a plate condition tool according to claim 3 and a slide gate valve wherein the anchoring system of the plate condition tool is configured to be anchored to at least one pinjutting out of the outer wall of the slide gate valve, said at least one pin comprising at least one groove located in the outer surface of said at least one pin or comprising a portion with a reduced cross section in the plane X2'X3' compared to a cross section of a distal end of the pin, in that the distal end is shaped as an anchoring head of said pin.

15. A kit of parts comprising (i) a plate condition tool according to claim 4, and (ii) an anchoring system comprising a leg fixable to said plate condition tool, a support base fixable to said leg and fastening means for fixing the support base to the ground.

16. A kit of parts comprising a plate condition tool according to claim 1 and a heat shield to be fixed to the outer wall (2w) of a slide gate valve, wherein said heat shield comprises a through hole for receiving the collector nozzle of the slide gate valve and wherein the anchoring system of the plate condition tool is configured to be anchored to an anchoring portion of said heat shield.

17. The kit of parts according to claim 16 comprising a plate condition tool according to claim 1, wherein the anchoring system of the plate condition tool is configured to be anchored to at least one anchoring passage in the heat shield, said at least one anchoring passage comprising an entry portion and a bottom portion, wherein a cross section in the plane X2'X3' of the bottom portion is larger than and encompasses a cross section in the plane X2'X3' of the entry portion.

18. The kit of parts according to claim 16 comprising a plate condition tool according to claim 2 and a heat shield wherein the anchoring system of the plate condition tool is configured to be anchored to at least one pin of said heat shield, said at least one pin comprising at least one groove located in the outer surface of said at least one pin or comprising a portion with a reduced cross section in the plane X2'X3' compared to a cross section of a distal end of the pin, in that the distal end is shaped as an anchoring head of said pm.

19. A method of operating the plate condition tool according to claim 1, wherein the slide gate valve is initially set in a closed configuration, and the slide gate valve plate is moved from the closed configuration to the open configuration.

20. A method of operating the plate condition tool according to claim 1, wherein a preliminary step for an adjustment of the sealing is implemented, said preliminary step comprising:

a) Operating the mechanical actuator such to press the collector nozzle seal against the collector nozzle;

b) Operating the gas injecting device such to reach a target pressure in the collector nozzle;
c) Measuring a residual gas flow necessary to maintain such target pressure in the collector nozzle;
d) Increasing a force applied by the mechanical actuator if the residual gas flow measured exceeds a given threshold.

* * * * *